United States Patent
Keller et al.

(10) Patent No.: US 6,946,111 B2
(45) Date of Patent: *Sep. 20, 2005

(54) SHORT CONTACT TIME CATALYTIC PARTIAL OXIDATION PROCESS FOR RECOVERING SULFUR FROM AN $H_2S$ CONTAINING GAS STREAM

(75) Inventors: Alfred E. Keller, Ponca City, OK (US); Joe D. Allison, Ponca City, OK (US); Sriram Ramani, Ponca City, OK (US); Terry D. Pruitt, Ponca City, OK (US)

(73) Assignee: ConocoPhilips Company, Bartlesville, OK (US)

( * ) Notice: Subject to any disclaimer, the term of this patent is extended or adjusted under 35 U.S.C. 154(b) by 105 days.

This patent is subject to a terminal disclaimer.

(21) Appl. No.: 10/024,679

(22) Filed: Dec. 18, 2001

(65) Prior Publication Data

US 2002/0134706 A1 Sep. 26, 2002

Related U.S. Application Data

(63) Continuation-in-part of application No. 09/742,999, filed on Dec. 20, 2000, now Pat. No. 6,579,510, which is a continuation-in-part of application No. 09/625,710, filed on Jul. 25, 2000.
(60) Provisional application No. 60/256,440, filed on Dec. 18, 2000, and provisional application No. 60/146,635, filed on Jul. 30, 1999.

(51) Int. Cl.[7] .............................................. C01B 17/04
(52) U.S. Cl. ................... 423/576.2; 423/576.8
(58) Field of Search ..................... 423/573.1, 576.2, 423/576.8; 585/800, 820; 208/208 R, 244

(56) References Cited

U.S. PATENT DOCUMENTS

| | | | |
|---|---|---|---|
| 1,930,716 A | 10/1933 | Jaegar | 260/57 |
| 2,963,348 A | 12/1960 | Sekkers | 23/225 |
| 4,038,036 A | 7/1977 | Beavon | 23/262 |
| 4,197,277 A * | 4/1980 | Sugier et al. | 423/231 |
| 4,219,445 A | 8/1980 | Finch | 252/443 |
| 4,271,041 A | 6/1981 | Boudart | 252/438 |
| 4,279,882 A | 7/1981 | Beavon | 423/574 |
| 4,311,683 A | 1/1982 | Hass et al. | 423/573 |

(Continued)

FOREIGN PATENT DOCUMENTS

| | | | |
|---|---|---|---|
| FR | 2702675 | 3/1993 | B01D/53/36 |
| RU | 2023655 | 11/1994 | |

OTHER PUBLICATIONS

PCT Search Report in PCT/US01/48792 dated Jul. 8, 2002.
Claridge, et al, *New Catalysts for the Conversion of Methane to Synthesis Gas: Molybdenum and tungsten Carbide*, J. Catalysis 180, 85–100 (1998).
D.A. Hickman, et al., *Synthesis Gas Formation by Direct Oxidation of Methane over Pt Monoliths*, J. J. Catalysis 138, pp. 267–282 (1992).
A. Cybulski and J.A. Moulijin, *Transformation of a Structured Carrier into Structured Catalyst*, Structured Catalysts and Reactors, Marcel Dekker, pp. 599–615, 1998.

(Continued)

*Primary Examiner*—Wayne A. Langel
(74) *Attorney, Agent, or Firm*—Conley Rose (57) ABSTRACT

A process for removing sulfur from a $H_2S$-containing gas stream is disclosed. A preferred embodiment of the process comprises incorporating a short contact time catalytic partial oxidation reactor, a cooling zone, and a condenser into a conventional refinery or gas plant process, such as a natural gas desulfurizer, a hydrotreater, coker or fluid catalytic cracker, in which sulfur removal is needed in order to produce a more desirable product. An $H_2S$-containing gas stream is fed into a short contact time reactor where the $H_2S$ is partially oxidized over a suitable catalyst in the presence of $O_2$ to elemental sulfur and water.

43 Claims, 3 Drawing Sheets

U.S. PATENT DOCUMENTS

| | | | | |
|---|---|---|---|---|
| 4,325,842 | A | | 4/1982 | Slaugh ........................ 252/443 |
| 4,325,843 | A | | 4/1982 | Slaugh ........................ 252/443 |
| 4,326,992 | A | | 4/1982 | Slaugh ........................ 252/443 |
| 4,331,544 | A | | 5/1982 | Takaya ........................ 252/443 |
| 4,406,873 | A | | 9/1983 | Beavon ........................ 423/574 |
| 4,481,181 | A | | 11/1984 | Norman ........................ 423/573 |
| 4,722,799 | A | * | 2/1988 | Ashbrook et al. .......... 210/722 |
| 4,797,268 | A | | 1/1989 | McGovern et al. ...... 423/574 R |
| 4,814,159 | A | | 3/1989 | Voirin ........................ 423/574 |
| 4,886,649 | A | | 12/1989 | Ismagilov ..................... 423/230 |
| 4,889,701 | A | | 12/1989 | Jones et al. ................. 423/220 |
| 4,891,187 | A | | 1/1990 | Jungfer et al. .............. 423/248 |
| 4,988,494 | A | | 1/1991 | Lagas et al. ................ 423/574 |
| 5,232,467 | A | | 8/1993 | Child et al. ................ 48/127.3 |
| 5,338,716 | A | | 8/1994 | Triplett ........................ 502/64 |
| 5,397,556 | A | | 3/1995 | Towler et al. .............. 423/220 |
| 5,451,557 | A | | 9/1995 | Sherif ........................ 502/177 |
| 5,472,920 | A | | 12/1995 | Dubois et al. .............. 501/103 |
| 5,512,260 | A | | 4/1996 | Kiliany et al. ........... 423/242.1 |
| 5,573,991 | A | | 11/1996 | Sherif ........................ 502/177 |
| 5,597,546 | A | | 1/1997 | Li et al. .................... 423/573.1 |
| 5,603,913 | A | | 2/1997 | Alkhazov ..................... 423/230 |
| 5,639,929 | A | | 6/1997 | Bharadwaj et al. .......... 585/658 |
| 5,648,582 | A | | 7/1997 | Schmidt ...................... 585/652 |
| 5,653,953 | A | | 8/1997 | Li et al. .................... 423/576.8 |
| 5,654,491 | A | | 8/1997 | Goetsch ................... 568/469.9 |
| 5,676,921 | A | | 10/1997 | Heisel et al. ............. 423/573.1 |
| 5,700,440 | A | | 12/1997 | Li ............................... 423/231 |
| 5,720,901 | A | | 2/1998 | De Jong et al. ............. 252/373 |
| 5,807,410 | A | | 9/1998 | Borsboom .................... 23/293 |
| 5,814,293 | A | | 9/1998 | Terorde et al. .............. 423/576 |
| 5,891,415 | A | | 4/1999 | Alkhazov et al. ......... 423/573.1 |
| 5,897,850 | A | | 4/1999 | Borsboom ............... 423/576.2 |
| 5,965,100 | A | | 10/1999 | Khanmamedov ......... 423/576.8 |
| 5,985,178 | A | | 11/1999 | Long et al. .................. 252/373 |
| 6,017,507 | A | | 1/2000 | Nougayrede et al. .... 423/573.1 |
| 6,083,471 | A | | 7/2000 | Philippe et al. ........... 423/573.1 |
| 6,099,819 | A | | 8/2000 | Srinivas et al. ........... 423/573.1 |
| 6,103,206 | A | | 8/2000 | Taylor, Jr. et al. .......... 423/210 |
| 6,103,773 | A | | 8/2000 | Wittenbrink et al. ....... 518/702 |
| 6,235,259 | B1 | * | 5/2001 | Ledoux et al. ........... 423/573.1 |
| 6,372,193 | B1 | * | 4/2002 | Ledoux et al. ........... 423/573.1 |
| 6,488,838 | B1 | * | 12/2002 | Tonkovich et al. ......... 423/651 |
| 6,497,812 | B1 | | 12/2002 | Schinski ..................... 208/131 |
| 6,540,975 | B2 | * | 4/2003 | Tonkovich et al. ......... 423/656 |
| 6,616,909 | B1 | * | 9/2003 | Tonkovich et al. ......... 423/651 |

OTHER PUBLICATIONS

M.E.D. Raymont, Role of hydrogen in Claus plants, Hydrocarbon Processing, 177–179 (1975).

Richard K. Kerr, et al, A new sulfur–recovery process: The RSRP, Oil & Gas Journal 230–243 (1982).

M.E.D. Raymont, Make hydrogen from hydrogen sulfide, Hydrocarbon Processing, 139–142 (1975).

R.H. Hass, et al, Process meets sulfur recovery needs, Hydrocarbon Processing 104–107 (1981).

J.A. Lagas, et al, Selective–oxidation catalyst improves Claus process, Oil & Gas Journal, (1988).

Z.R. Ismagilov, et al, New Catalysts and Processes For Environment Protection, React. Kinet. Catal. Lett., vol. 55, No. 2, 489–499 (1995).

Kuo–Tseng Li and Ni–Shen Shyu, Catalytic Oxidation of Hydrogen Sulfide to Sulfur on Vanadium Antimonate, Ind. Eng. Chem. Res. 1480–1484 (1997).

J. B. Hyne, *Methods for desulfurization of effluent gas streams*, The Oil & Gas Journal, 64–78 (1972).

B. Gene Goar, *Today's Sulfur Recovery Processes*, Hydrocarbon Processing vol 47, No. 9, 248–252 (1968).

R. Gene Goar, *First Recycle Selectox unit onstream*, Oil & Gas Journal, 124–125 (1982).

Sung Woo Chun, et al, *Selective oxidation of H2S to elemental sulfur over $TiO_2$ /$SiO_2$ catalysts*, Applied Catalysis B: Environmental 16, 235–243 (1998).

H. Austin Taylor and Charles F. Pickett, *The Decomposition of Hydrogen Sulphide*, J of Phys. Chem. vol. 31 pp. 1212. (1927).

J. Chao, *Properties of Elemental Sulfur, Hydrocarbon Processing*, 217–223, (1980).

David M. Haaland, *Noncatalytic Electrodes for Solid–Electrolyte Oxygen Sensors*, J. Electrochem. Soc.: Electrochemical Science and Technology, vol 127, No. 4, 796–804 (1980).

J.W. Mellor, *A Comprehensive Treatise on Inorganic and Theoretical Chemistry*, vol.X, Longmans, Green and Co., New York, 118–119, 128–129, 206–213,221–223,144–148, 152–159,162–166,393–400.

PCT Search Report in PCT/US00/40489, Jul. 26, 2000.

PCT Search Report in PCT/US00/20252, Jul. 26, 2000.

PCT Search Report in PCT/US01/48795 dated Jun. 26, 2002 (1 p.).

R.W. Watson et al., "*The successful use of oxygen in Claus plants*," HTI Quarterly: Winter 1995/96, pp. 95–101, (no month).

B. W. Gamson et al., "*Sulfur from Hydrogen Sulfide,*" Chem. Eng. Prog., Apr. 1953, vol. 49, No. 4, pp. 203–215.

Arthur L. Kohl and Fred C. Riesenfeld, *Gas Purification, Fourth Edition*, Gulf Publishing Company, Library of Congress Cataloging in Publication Data, TP7545K6, 1985, 665.7, 85–4148, ISBN 0–87201–314–6, pp. 457–460, (no month).

\* cited by examiner

SHORT CONTACT TIME CATALYTIC PARTIAL OXIDATION PROCESS FOR RECOVERING SULFUR FROM AN H₂S CONTAINING GAS STREAM

CROSS REFERENCE TO RELATED APPLICATIONS

This application claims the benefit under 35 U.S.C. §119 (e) of U.S. Provisional Patent Application No. 60/256,440 filed Dec. 18, 2000. This application is also a continuation-in-part of U.S. patent application Ser. No. 09/742,999 filed Dec. 20, 2000 (U.S. Pat No. 6,579,510), which is a continuation-in-part of U.S. patent application Ser. No. 09/625,710 filed Jul. 25, 2000, abandoned, that claims the benefit under U.S.C. §119(e) of U.S. Provisional Patent Application No. 60/146,635 filed Jul. 30, 1999.

BACKGROUND OF THE INVENTION

1. Technical Field of the Invention

The present invention generally relates to methods of desulfurizing $H_2S$-containing gas streams. More particularly, the present invention relates to sulfur recovery processes employing the catalyzed direct partial oxidation of $H_2S$ to elemental sulfur and water and to catalyst compositions that are active for catalyzing that process.

2. Description of the Related Art

Hydrocarbon gases that occur as natural formations in the ground ("natural gas") typically contain a mixture of gaseous hydrocarbons, chiefly methane and some $C_2$–$C_4$ alkanes, and often includes up to 25% hydrogen sulfide. The hydrogen sulfide content is problematic. Not only does it have an intensely unpleasant odor, it is also toxic and constitutes an unwanted component in the end products produced from the natural gas. Governmental regulations restrict the amount of $H_2S$ that can be introduced into the environment to only a few parts per million. Because it is more economical to transport natural gas in the form of a liquid rather than as a gas, most natural gas production operations include converting the natural gas to liquefied petroleum gas (LPG) at the well site. A drawback of working with the $H_2S$-containing LPG is that the $H_2S$, in concentrated form, is extremely corrosive to the steel pipes and containers used to transport the hydrogen sulfide-containing gases and liquids. As a result of all of the above-described problems, $H_2S$-containing natural gas formations have tended to be underutilized in the petroleum industry. There is currently a great deal of renewed interest in using the world's plentiful natural gas resources. As a result, there is great effort in the industry now being directed toward separating at the well site the hydrocarbon portion of petroleum gases from its hydrogen sulfide component, and recovering the $H_2S$ as elemental sulfur. While various methods exist for removing hydrogen sulfide from gases and liquids during petroleum processing, most of those processes require large, expensive Claus plants, or modified Claus plants, for extracting and processing the sulfur. Conventional desulfurization operations are not practical for use at small operations such as remote well sites or on natural gas producing off shore oil platforms. A more economical, efficient method employing less equipment for the selective removal of hydrogen sulfide from natural gas at the site of production is needed.

Sulfur-recovery plants, also called Claus plants, are well known for use in removing sulfur from hydrogen sulfide gas resulting from petroleum refinery processes such as crude oil hydrodesulfurization processes. The Claus method is efficient for processing large quantities of gases containing a high concentration (i.e., >40 vol. %) $H_2S$ for plants producing more than 100,000 tons of sulfur per year. The Claus process is not suitable for use in cleaning up hydrogen or light hydrocarbon gases (such as natural gas) that contain $H_2S$, however. Not only is the hydrocarbon content lost in the initial thermal combustion step of the Claus process, but carbon, carbonyl sulfide and carbon disulfide which are produced cause catalyst fouling and dark sulfur. Moreover, carbonyl sulfide is difficult to convert to elemental sulfur. Over the years various changes to the Claus process have been suggested, many of which are directed primarily toward improving or replacing the thermal reactor. See, for example, U.S. Pat. Nos. 4,279,882, 4,988,494, 5,597,546 and 5,653,953.

In the past, others have usually addressed the problem of purifying hydrogen sulfide contaminated hydrogen or gaseous light hydrocarbon resources by employing an amine extraction technique. Typically, alkanolamine absorption of the $H_2S$ component of the gas stream is performed, followed by $H_2S$ regeneration and conventional multistage Claus sulfur recovery, usually including tail gas treatments. According to conventional industrial practices, a hydrocarbon or hydrogen containing gas stream containing a low concentration of $H_2S$ is contacted with a water solution containing an alkanolamine. Alkanolamines commonly employed in the industry are monoethanolamine (MEA), diethanolamine (DEA), methyldiethanol amine (MDEA), diglycolamine (DGA), and diisopropanolamine (DIPA). These are basic nitrogen compounds. The basic alkanolamine reacts with the $H_2S$ and other gases that form acids when dissolved in water to form alkanolamine salts, according to the following generic reaction:

Alkanolamine+Acid Gas=Protonated alkanolamine+weak acid anion

When ethanolamine is the basic alkanolamine, the reaction is:

(1)

The hydrogen or hydrocarbon gas, substantially freed of $H_2S$, is recovered and may be used as fuel or routed to another system for processing. After absorbing the $H_2S$ from the gas, the alkanolamine solution is transported, heated, and placed in a stripping tower. Steam, generated from boiling the alkanolamine solution at the bottom of the stripping tower, lowers the vapor pressure of the acid gas above the solution reversing the equilibrium of the acid gas/alkanolamine reaction shown above. The acid gases leaving the stripper are cooled to condense most of the remaining steam. The acid gas stream then goes to a Claus sulfur recovery plant. In the Claus sulfur plant, the $H_2S$ gas from the alkanolamine stripper is contacted with air or a mixture of oxygen and air in a flame. One third (⅓) of the $H_2S$ is burned according to the equation:

(2)

The remaining ⅔ of the $H_2S$ is converted to sulfur via the Claus reaction:

(3)

(x=2, 6, or 8 depending on temperature and pressure)

The gases are cooled in a fire tube boiler after the burner. Nominally, this step converts 55 to 70% of the $H_2S$ to elemental sulfur. The equilibrium of the Claus reaction of equation (3) limits the conversion. To improve the yield, elemental sulfur is condensed from the gas stream. After sulfur condensation and separation from the liquid sulfur, the unreacted gases are heated to the desired temperature, passed over a catalyst that promotes the Claus reaction, and cooled again to condense and separate the sulfur. Typically, 2 to 3 stages of Claus reheater, reactor, and condenser stages are employed. Anywhere from 90 to 98% of the $H_2S$ fed to the unit is recovered as elemental sulfur.

Any remaining $H_2S$, $SO_2$, sulfur, or other sulfur compounds in the Claus plant effluent are either incinerated to $SO_2$ and discharged to the atmosphere, or incinerated to $SO_2$ and absorbed by chemical reaction, or converted by hydrogen to $H_2S$ and recycled or absorbed by an alkanolamine solution. This is accomplished by various Claus "tail gas" treatment units, which improve the efficiency of sulfur removal from the gas discharged to the atmosphere. Other techniques for improving efficiency of sulfur removal that have been described in the literature include: 1) adsorbing sulfur cooled below the freezing point on a solid material followed by releasing the trapped sulfur as a liquid by heating the solid adsorbent; 2) selectively oxidizing the remaining $H_2S$ to sulfur using air; and 3) selectively oxidizing the $H_2S$ to sulfur employing aqueous redox chemistry utilizing chelated iron salts or nitrite salts in an attempt to purifying hydrogen sulfide contaminated hydrogen or gaseous light hydrocarbon resources. According to these methods, the $H_2S$-contaminated hydrogen or hydrocarbon stream is contacted directly with the redox reagent such as chelated iron (III) ions. The iron (III) is reduced to iron (II) ion while the $H_2S$ is converted to elemental sulfur. The sulfur in liquid form is separated from the solution. These types of desulfurization units have been proven to be practical when the amount of sulfur to be removed from the stream is below 5 long tons per day.

U.S. Pat. Nos. 5,700,440; 5,807,410 and 5,897,850 describe some of the limitations of existing tail gas treatment (TGT) processes and the difficulty of meeting increasingly stringent government requirements for desulfurization efficiency in the industry. J. B. Hyne (*Oil and Gas Journal* Aug. 28, 1972: 64:78) gives an overview of available processes for effluent gas stream desulfurization and discusses economical and environmental considerations. R. H. Hass et al. (*Hydrocarbon Processing* May 1981:104–107) describe the BSR/Selectox™ process for conversion of residual sulfur in Claus tail gas or for pre-Claus treatment of a gas stream. K-T Li at al. (*Ind. Eng. Chem. Res.* 36:1480–1484 (1997)) describe the SuperClaus™ TGT system which uses vanadium antimonate catalysts to catalyze the selective oxidation of hydrogen sulfide to elemental sulfur. U.S. Pat. No. 5,603,913 describes several oxide catalysts that have been suggested for catalyzing the reaction $H_2S + \frac{1}{2}O_2 \rightarrow \frac{1}{2}S_2 + H_2O$  (4)

Because reaction (4) is not a thermodynamically reversible reaction, direct oxidation techniques offer potentially higher levels of conversion than is typically obtainable with thermal and catalytic oxidation of $H_2S$. Most direct oxidation methods are applicable to sour gas streams containing relatively small amounts of $H_2S$ and large amounts of hydrocarbons, but are not particularly well suited for handling the more concentrated acid gas streams from refineries. For this reason direct oxidation methods have been generally limited to use as tail gas treatments only, and have not found general industrial applicability for first stage sulfur removal systems from gases containing large quantities of $H_2S$. According to B. G. Goar (*Hydrocarbon Processing* 47:248–251 (1968)) the acid gas stream for the modified Claus process should contain less than 2 mole % of light hydrocarbons and from 15 to essentially 100% $H_2S$.

This restriction to low $H_2S$ concentration gases is due, in part, to the increase in adiabatic heating of the catalyst bed that occurs at higher concentrations of $H_2S$, i.e., above about 3 vol. %. The limit of heat tolerance of the reaction vessel, which is typically made of steel, can be quickly reached when a high concentration of $H_2S$ is reacted. Also, the higher temperatures (above about 350° C.) cause an increase in the rate of reaction of $SO_2$ formation. Additionally, the $H_2S$ concentration range is usually kept low because of the necessity for supplying excess $O_2$ to overcome deactivation of most direct oxidation catalysts caused by water. As a practical matter, this need for a stoichiometric excess of $O_2$ precludes using $H_2S$ concentrations above about 2 vol. %. J. A. Lagas et al. (*Oil & Gas Journal* Oct. 10, 1988: 68–71) describe a selective-oxidation catalyst (SuperClaus™) for use in a third tail gas reactor to improve a Claus process. It is suggested that in an excess of air, an ideal catalyst should be insensitive to $H_2O$ concentration, incapable of oxidizing CO, $H_2$ or $CH_4$, incapable of forming COS and $CS_2$, and active for producing only a very small amount of $SO_2$. The composition of such ideal catalyst is not disclosed. S. W. Chun et al. (*Applied Catalysis B: Environmental* 16:235–243 (1998)) describe a $TiO_2/SiO_2$ particulate catalyst that is not deactivated by the water formed in the partial oxidation reaction at a reactant gas ratio of 0.5–4 $O_2$:$H_2S$. In that report the $H_2S$ conversion is carried out with a fixed bed catalyst at a temperature of 275° C. and at a gas hourly space velocity (GHSV) of 3000 $hr^{-1}$.

Amine strippers and Claus plants in use today are normally operated at less than 2 atmospheres pressure. Because of this low pressure, the pipes and vessels have very large diameters for the flow compared to most refinery or gas plant processes. The low pressure operation forces the equipment to be designed for low pressure drop to have adequate capacity. Therefore, a typical modified Claus plant, together with one or more tail gas treatment units, is large and the plant includes a great deal of equipment.

There have been many efforts to reduce the size, cost or complexity of sulfur removal plants. For instance, U.S. Pat. No. 4,279,882 describes using a catalytic selective oxidation process to eliminate the conventional Claus combustion chamber and heat exchanger. According to that process, stoichiometric amounts of oxygen and $H_2S$ are passed over a vanadium oxide catalyst on a porous refractory oxide support. The catalyst is described as being substantially incapable of oxidizing hydrogen, methane and carbon monoxide and capable of selectively oxidizing $H_2S$ to $SO_2$ and sulfur, without forming $SO_3$. The upper limit of the reaction temperature is 850° F. (454° C.) in order to avoid damage to steel vessels and to prevent formation of tarry products from $C_3$ or greater hydrocarbon components in the feed gas. At least one additional Claus catalytic reactor follows the first stage oxidation stage.

Z. R. Ismagilov et al. (React. Kinet. Catal. Lett. 55:489–499 (1995)) suggest that monolith catalysts containing oxides of Co, V, Fe, Cr, Mn or Al have activity for catalytically converting the $H_2S$ in natural gas to sulfur in a first oxidation stage. The reaction conditions include a spherical particulate vanadium catalyst in a fluid bed reactor operating at 250–300° C., $O_2$:$H_2S$=0.5–1.1 and $t_c$=0.5–0.8 s. Under such conditions $H_2S$ conversion and process selectivity of 99% is reported.

U.S. Pat. No. 4,886,649 (Ismagilov, et al.) describes a two stage direct oxidation process employing fluidized catalyst beds containing $MgCrO_4$ and $Al_2O_3$, or $V_2O_5$ and $Al_2O_3$. According to that method, oxygen is supplied to the first oxidation stage in an amount of 100–110% of the stoichiometric amount necessary for oxidation of $H_2S$ to elemental sulfur. The range of treatable $H_2S$ containing gases is extended to gases containing about 30–50 vol. % $H_2S$. The granular catalyst in a fluidized bed with a cooling coil or jacket, allows temperature uniformity of the catalyst bed. A maximum temperature level of 250–350° C. is desired in order to avoid forming products of coking and cracking of hydrocarbon components of the feed gas.

U.S. Pat. No. 6,235,259 (Ledoux et al.) describes a regenerative process for oxidizing $H_2S$ contained in low concentration in a gas directly to sulfur over a Ni, Fe, Co, Cu, Ch, Mo or W oxysulfide catalyst carried on a silicon carbide support and a transition metal compound. The direct oxidation is carried out at a temperature that is below the dew point of the sulfur, which becomes deposited on the catalyst. Periodically, the catalyst is regenerated by flushing the sulfur-laden catalyst with a 200–500° C. non-oxidizing gas to vaporize the sulfur, and the catalyst is then cooled for reuse.

U.S. Pat. No. 6,299,851 (Li et al.) describes a method for selectively oxidizing hydrogen sulfide to elemental sulfur at a temperature of 50 to 400° C. and at a pressure of 0.1 to 50 atm in the presence of a catalyst. The catalyst includes a vanadium-containing material, which could be vanadium carbide, and a catalytic substance chosen from scandium (Sc), yttrium (Y), lanthanum (La), samarium (Sm) and compounds thereof.

In an unrelated area of endeavor, various carbided metal catalysts have been prepared, some of which have been used for catalyzing the oxidative conversion of methane to synthesis gas. For example, Claridge et al. (*J. Catalysis* 180:85–100 (1998)) have described high-surface-area molybdenum carbide catalysts and tungsten carbide catalysts for conversion of methane to synthesis gas via steam reforming, dry reforming or partial oxidation processes. Maintaining elevated pressure during the conversion process stabilized the carbide and deterred catalyst deactivation.

U.S. Pat. No. 4,325,843 (Slaugh et al.) describes a process for making a supported tungsten carbide composition for use as a catalyst. The process includes impregnating an oxidic support material with a solution of a tungsten salt, converting the tungsten to a nitride and treating the supported tungsten nitride with a carbiding gas mixture.

U.S. Pat. No. 4,325,842 (Slaugh et al.) describes a process for preparing a supported molybdenum carbide catalyst by impregnating a porous support with a solution of hexamolybdenum dodecachloride, drying, and heating in a carbiding atmosphere. U.S. Pat. No. 4,326,992 (Slaugh et al.) describes another process for preparing a supported molybdenum carbide catalyst. In this process an ammonium hydroxide solution of molybdic acid is applied to a porous support, dried and heated in a carbiding atmosphere. U.S. Pat. No. 5,338,716 (Triplett et al.) discloses a supported non-oxide metal carbide-containing catalyst that includes an oxide support, a passivating layer, and a non-oxide metal ceramic catalytic component such as tungsten carbide or molybdenum carbide, or another Group VI metal carbide or nitride.

U.S. Pat. Nos. 5,451,557 and 5,573,991 (Sherif) disclose other processes for forming a metal carbide catalyst such as tungsten carbide or another Group VIB transition metal carbide. U.S. Pat. No. 4,331,544 (Takaya et al.) describes a catalyst for catalyzing the synthesis of methane from CO and $H_2$. That catalyst comprises a nickel-molybdenum alloy and a molybdenum carbide supported on a porous carrier. Still other metal carbide catalysts are disclosed in U.S. Pat. Nos. 4,219,445 (Finch), U.S. Pat. No. 1,930,716 (Jaeger), and U.S. Pat. No. 4,271,041 (Boudart et al.).

None of the existing $H_2S$ direct oxidation processes adequately address the typical reactor temperature limitations nor do they operate at sufficiently high flow rates to be sufficiently useful industrially. Neither do the conventional desulfurization processes provide adequately high levels of $H_2S$ conversion and selectivity for elemental sulfur product in a single-pass reaction when treating higher concentration $H_2S$ streams. Catalysts used in the conversion of sulfur compounds today typically suffer from deactivation due to sulfur deposits and/or metal sulfide formation that removes the active form of the catalyst. Conventional methods that require the handling of sulfur-containing hydrocarbon feeds typically use a high precious metal (e.g., Rh) loading. In the case of Claus-type processes, longer catalyst beds are used to offset the inevitable deactivation. A major drawback of conventional Claus processes is that the hydrogen used to form $H_2S$ in an upstream process is lost by forming water in the oxidation of the $H_2S$. In a refinery where the hydrogen-generating processes do not keep pace with the rate of hydrogen consumption and hydrogen must therefore be externally supplied, sulfur recovery using the Claus process is particularly undesirable. Most existing desulfurization processes and systems must resort to use of additional pre-treatments or post-treatment catalytic stages and tail gas treatments in order to salvage the usable hydrocarbon constituents of the gas stream and to adequately clean the waste gas that is vented into the air. Better systems and processes for removing sulfur from $H_2S$ will find widespread use in a number of industrial applications, particularly in the petroleum industry for more effectively utilizing the world's abundant $H_2S$-containing natural gas resources, much of which contains 3–40% $H_2S$.

BRIEF SUMMARY OF PREFERRED EMBODIMENTS

The sulfur removal process and catalysts of the present invention, and systems that employ them, overcome many of the problems with the current hydrogen sulfide removal technologies. The new process eliminates the need for large vessels operating at low pressures because, in preferred embodiments, it can be carried out at superatmospheric pressures. Because the process of the present invention promotes the reaction $H_2S + \frac{1}{2}O_2 \rightarrow 1/x\ S_x + H_2O$ (x=2, 6 or 8, preferably 2), it avoids the Claus reaction equilibrium restriction imposed by combustion of $H_2S$ to $SO_2$. In applications involving the removal of sulfur from a light hydrocarbon stream, the need for an $H_2S$ absorption system employing alkanolamines is eliminated with a sulfur removal process of the present invention. The present process does not rely on selectively absorbing $H_2S$ from streams using alkanolamine solutions, boiling the $H_2S$ out of the alkanolamine solution, and then converting the $H_2S$ to elemental sulfur in a Claus sulfur recovery/tail gas treating unit. By substituting a sulfur removal system including the process of the present invention for a conventional sulfur removal unit, a plant that incorporates the new process can be built more compactly and economically, and can be maintained at less cost than a conventional plant employing an amine/sulfur complex.

The present process also provides an improvement over other catalytic direct oxidation methods for converting $H_2S$ directly to sulfur by eliminating the need to limit the operating temperature to below the dew point of sulfur, or below 500° C., and avoids the need for a large stoichiometric excess amount of $O_2$. The new process also overcomes a usual disadvantage of existing direct oxidation methods by efficiently desulfurizing gases containing a higher concentration of $H_2S$ than is possible with the existing methods. Under preferred optimal conditions, the level of $H_2S$ conversion obtained in a single pass process is high enough that no additional, or tail gas treatment of the exiting gas is necessary. The new process, and system employing such a process, are capable of operating at gas hourly space velocities above 100,000 $hr^{-1}$ and providing high conversion levels of $H_2S$ and high selectivity for elemental sulfur production. These improvements provide a much simpler sulfur process unit that can be incorporated in line with most petroleum refinery or natural gas plants such as hydrotreaters, cokers, and fluid catalytic crackers. The process of the present invention employs active catalysts or catalyst devices that have not been previously described as active for catalyzing the direct partial oxidation of $H_2S$ to sulfur and water in a short contact time reactor. Under certain conditions, in some embodiments of the process the hydrocarbon components of a $H_2S$-contaminated light hydrocarbon stream are cleaned up by selectively oxidizing the $H_2S$ to sulfur with minimal oxidation of the hydrocarbons.

In accordance with certain embodiments of the present invention, a process is provided for removing sulfur from a gas stream. The gas stream may contain a small concentration of $H_2S$ or up to 100% $H_2S$. A short contact time, or millisecond contact time reactor is employed which includes a gas mixing zone for forming a reactant gas mixture. The mixing zone has an inlet for the gas stream containing a quantity of $H_2S$ and an inlet for an $O_2$ containing gas stream. The reactor also has at least one reacted gas outlet in fluid communication with a cooling zone. Disposed between the inlet and the outlet is a reaction zone that is in fluid communication with both the inlet and outlet. A porous thermal shield is preferably included in the reactor between the mixing zone and the reaction zone to help prevent pre-ignition and combustion of the reactant gases prior to contacting the catalyst. The reaction zone contains a catalyst or catalyst device that has activity for catalyzing the SCPOX reaction $H_2S + \frac{1}{2}O_2 \rightarrow 1/x\ S_x + H_2O$, wherein x=2, 6 or 8, under reaction promoting conditions. The term "SCPOX," as used in this disclosure means "sulfur catalytic partial oxidation," and the term "CPOX" refers to the "catalytic partial oxidation of hydrocarbons."

Ensuring SCPOX reaction promoting conditions may include adjusting the relative amounts of $H_2S$, $O_2$ and other oxidizable components (e.g., hydrocarbons) in the feed gas mixture. For example, preferably no more than a stoichiometric amount of $O_2$, relative to the carbon content of the feed mixture, sufficient to support the CPOX reaction is provided, in order to deter oxidation of other components in the feed. SCPOX reaction promoting conditions may also include adjusting the amount of preheating of the reactant gas mixture and/or external heat applied to the catalyst, adjusting the operating pressure of the reactor, which is preferably maintained above atmospheric pressure, more preferably in excess of two atmospheres pressure. Increasing or decreasing the space velocity of the feed gas mixture, which varies according to the configuration of the catalyst bed, its porosity and the associated pressure drop, also can be used to favor the SCPOX reaction.

In some embodiments the catalyst device contains a reduced metal such as platinum, rhodium, nickel, palladium, ruthenium, iridium, or a mixture of any of those metals. In some embodiments the catalyst also contains a lanthanide metal or metal oxide, and in certain embodiments the catalyst device comprises a porous refractory catalyst support made of a material such as $Al_2O_3$, $ZrO_2$ or partially stabilized (MgO) zirconia (PSZ). In certain embodiments the catalyst device comprises one or more layers of wire gauze. In some embodiments, the catalyst device comprises a monolith structure or a packed bed of discrete or divided units or structures, such as regularly or irregularly shaped particles, granules, beads, pills, pellets, cylinders, trilobes, extrudates or spheres. With any of those forms of supported catalyst, a preferred catalytic metal is Pt, Rh, more preferably a Pt-Rh mixture. In some embodiments the catalyst device contains a Pt—Rh alloy supported on a lanthanide, preferably samarium, coated refractory support. In some embodiments, the catalyst device contains a carbided metal, preferably a Pt—Rh mixture.

In a preferred embodiment, the process comprises, in a millisecond contact time reactor, passing the $H_2S$-containing gas stream, mixed with $O_2$, in a molar ratio of about 2:1 $H_2S:O_2$, over the catalyst device such that the above-described partial oxidation reaction occurs. The temperature of the mixing zone and the reaction zone are maintained above the dewpoint of sulfur, to avoid deposition of sulfur inside the reactor. Preferably the process also includes maintaining the temperature of the catalyst device sufficiently high to substantially prevent sulfur poisoning of the catalyst device. In some embodiments the catalyst temperature is maintained at or above about 700° C., preferably below 1,500° C., and more preferably in the range of 850° C.-1,300° C. especially when a metal is employed that is susceptible to sulfur poisoning. The contact time between the catalytic surfaces of the catalyst device and the gas stream is maintained at is no more than about 200 milliseconds, preferably under 50 milliseconds, and more preferably less than 20 milliseconds. Less than 10 millisecond contact time is highly preferred. A product stream comprising liquid elemental sulfur is recovered. A desired gaseous product is preferably also recovered. In some embodiments of the process the $H_2S$ containing gas also contains a light (i.e., $C_1$–$C_5$) hydrocarbon, such as methane, and the desulfurized hydrocarbon gas is recovered. There may be instances where hydrocarbons greater than $C_5$ are also present in small quantities, and they are also recoverable essentially unharmed by the process.

According to some embodiments of the process, the $H_2S$-containing stream also contains $H_2$, and the process recovers a substantially sulfur-free $H_2$ product stream which is suitable for feeding back into an $H_2$-consuming process, such as a hydrotreater.

In some embodiments the catalyst device is initially heated to at least about 700° C. while passing the reactant gas mixture over the catalyst device until the reaction is initiated. Certain embodiments of the process employ pure $O_2$ air, and $O_2$ enriched air as the $O_2$ containing gas. In some embodiments reaction promoting conditions are maintained such that the reaction continues autothermally, i.e., substantially no externally supplied heat must be provided to the catalyst in order to sustain the partial oxidation reaction. In some embodiments, the temperature of the reactant gas mixture is kept at least about 200° C. prior to its entering the reaction zone.

In some embodiments, the process of removing sulfur from an $H_2S$ containing hydrocarbon stream employs a sulfur resistant catalyst device that made by a method that includes avoiding exposure of said catalytic material to a sulfur-containing compound at a temperature at which sulfur can chemically react with or physically deposit on said catalytic material. According to preferred embodiments, the process also includes heating the catalytic material, in the presence of a light hydrocarbon, to a temperature sufficient to cause at least a portion of the catalytic material to associate with carbon in the same chemical phase.

An advantage provided by certain embodiments of the present invention is that existing processes for removing $H_2S$ from an $H_2S$-containing gaseous stream that customarily employs a Claus sulfur recovery plant with a first stage furnace in which $H_2S$ is combusted and which also has at least one second stage partial oxidation unit in which $H_2S$ is directly oxidized to elemental sulfur and water, is that such plants can be improved by substituting a flameless millisecond contact time catalytic reactor for the combustion furnace or for one or more second stage partial oxidation units and by employing the $H_2S$ catalytic partial oxidation process as described herein. These and other aspects, embodiments, features and advantages of the present invention will become apparent with reference to the following drawings and description.

BRIEF DESCRIPTION OF THE DRAWINGS

For a more detailed description of the present invention, reference will now be made to the accompanying Figures, wherein.

DETAILED DESCRIPTION OF PREFERRED EMBODIMENTS

The present method of partially oxidizing $H_2S$ to elemental sulfur and water (also referred to herein as the $H_2S$ catalytic partial oxidation process) employs a very fast contact (i.e., millisecond range)/fast quench (i.e., less than one second) reactor assembly, described in more detail below. The sulfur catalytic partial oxidation (SCPOX) reaction is carried out in a short contact time flow reactor that is capable of withstanding temperatures up to about 1,500° C. The short contact time reactor is preferably similar to those that are used for carrying out catalytic partial oxidation (CPOX) of light hydrocarbons, which have been described in the literature. For example, L. D. Schmidt and his colleagues at the University of Minnesota describe a millisecond contact time reactor in U.S. Pat. No. 5,648,582 and in *J. Catalysis* 138, 267–282 (1992) for use in the production of synthesis gas by direct oxidation of methane over a catalyst such as platinum or rhodium. A general description of major considerations involved in operating a reactor using millisecond contact times is given in U.S. Pat. No. 5,654, 491. The disclosures of these references are hereby incorporated herein by reference.

Figure 2:
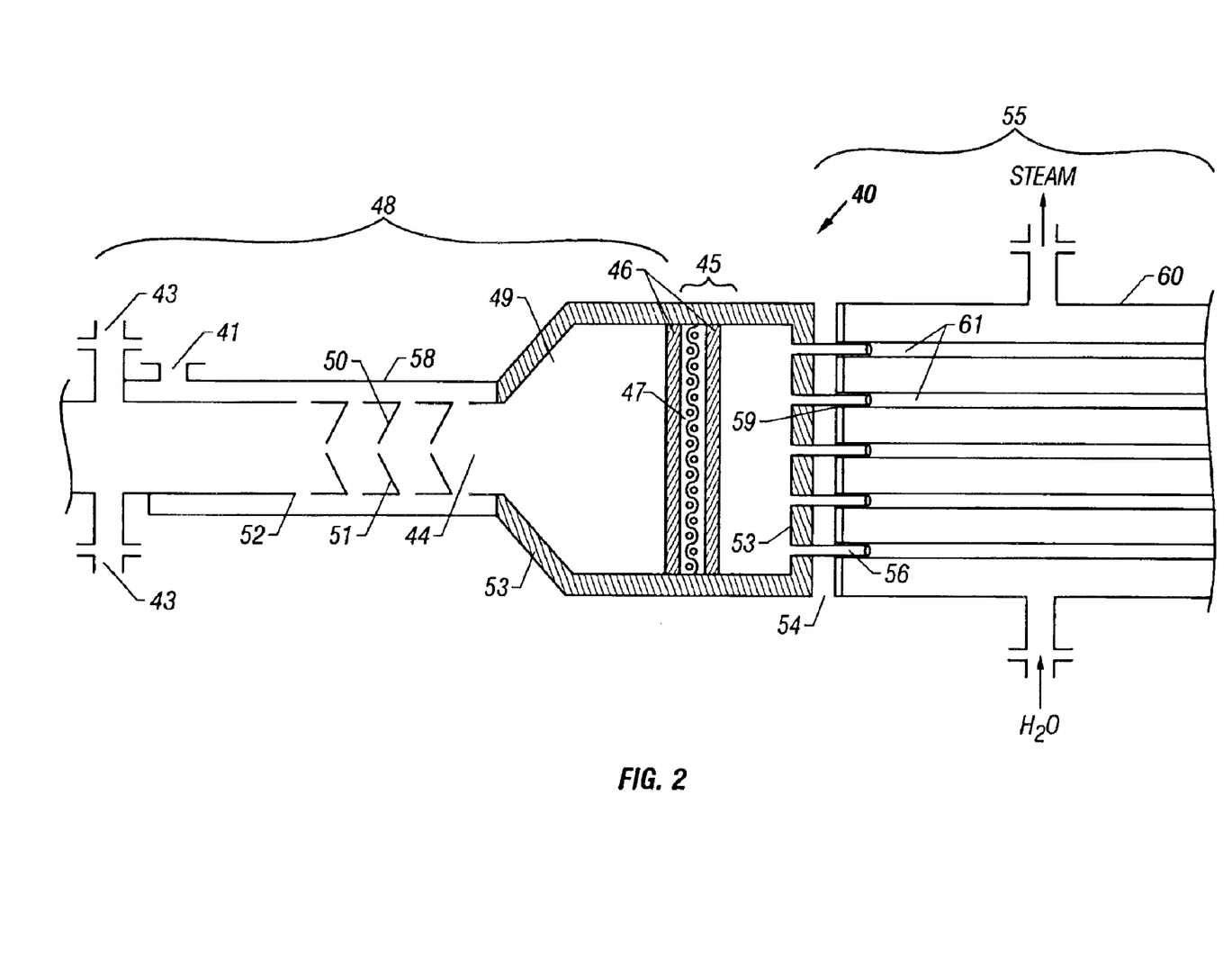
FIG. 2 is an enlarged cross-sectional view of the millisecond contact time reactor shown in FIG. 1.

Referring initially to FIG. 2, reactor 40 of a preferred $H_2S$ partial oxidation assembly is shown. Reactor 40 includes feed injection openings 43 and 41, a mixing zone 48, a reaction zone 45 and a cooling zone 55. Reaction zone 45 preferably includes a thermal radiation barrier 46 positioned immediately upstream of a catalytic device 47 in a fixed-bed configuration. Radiation barrier 46 is preferably a porous ceramic or refractory material that is suited to withstand operating temperatures and provide sufficient thermal insulation. Adjacent reaction zone 45 is a cooling zone 55 that includes ceramic ferrules 56 embedded in refractory material 53, and a tube sheet 54 containing a plurality of thermally conductive tubes 61. Tubes 61 extend from the process (reacted) gas outlet of reactor 40 through a heat exchanger 60, such as a waste heat or firetube boiler, as illustrated in FIG. 2, for cooling the reacted gases. Tube sheet 54 is a divider between the process gas and the boiling water where the hot process gas exits the reactor and enters boiler 60. The tubes 61 and tube sheet 54 are preferably made of carbon steel. The tube sheet forces the process gas to exit the reactor by going through the inside of tubes 61. Boiling water, contained by the shell of the heat exchanger surrounds the outside of tubes 61. Since the carbon steel of the tubes and tube sheet cannot stand the high temperatures of the process gas (i.e., about 1,300° C.), temperature protection for the metal in both is needed. For tubes 61 and for most of the tube sheet 54, this protection is afforded by the boiling water. Since the boiling water remains at a constant temperature, and since the metal conducts heat so readily, the tubes and most of the tube sheet attain temperatures only slightly above the temperatures of the boiling water (i.e., about 100° C.). This is not the case for the portions of the tube sheet where tubes 61 connect at joints 59. Without thermal protection, these joints and the first part of the tube would see temperatures far exceeding the safe operating limits for the metal. The refractory covering 53 and ceramic ferrules (tube inserts) 56 provide insulation for these relatively unprotected areas of metal. Thus, only metal surfaces that are adequately exposed to the boiling water will encounter the hot gases. Alternatively, instead of using a boiler, the process gas can be rapidly quenched or cooled by any other suitable technique, to a temperature above the dewpoint of sulfur.

Figure 3:
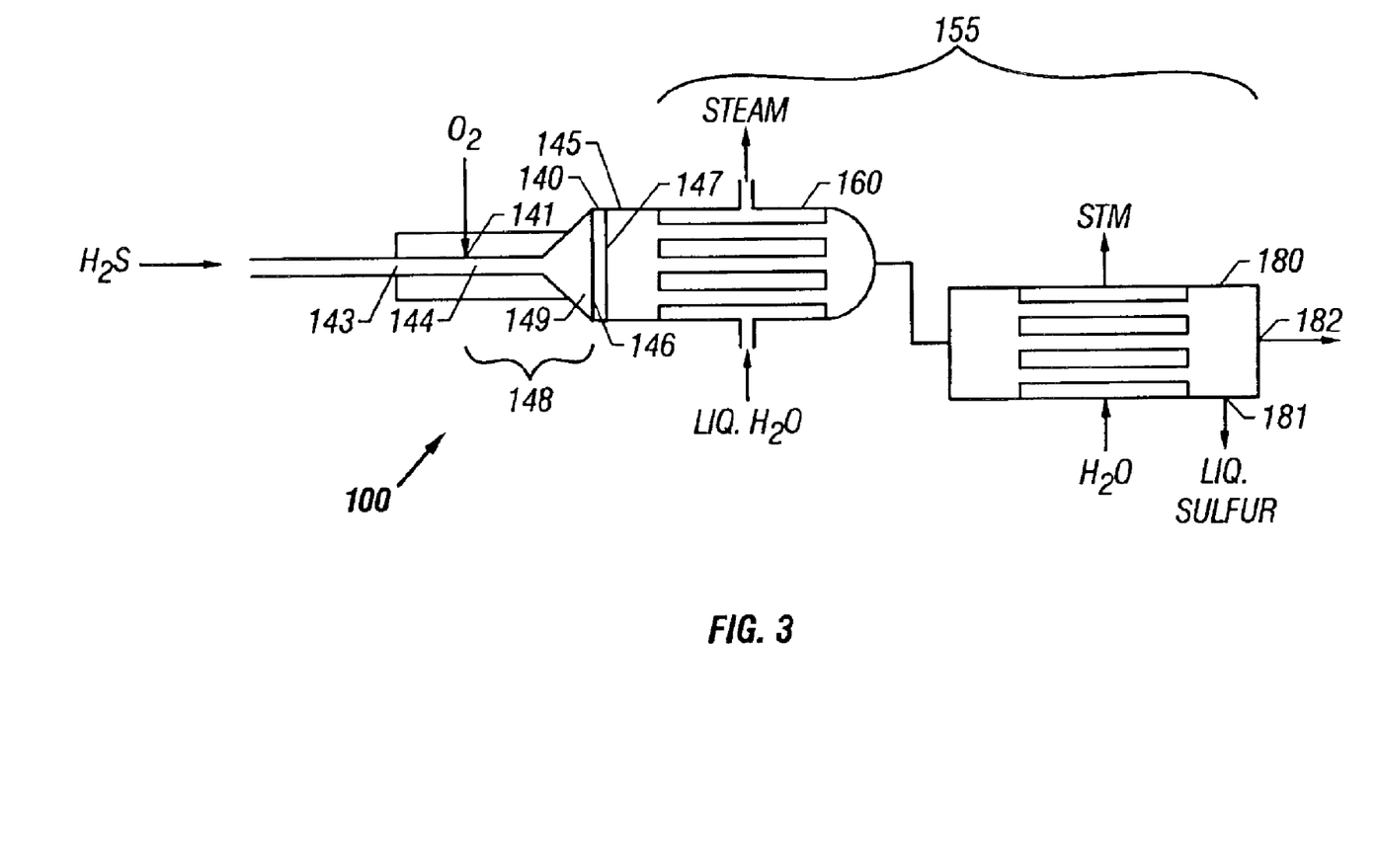
FIG. 3 is a diagram of an embodiment of a natural gas purification system for carrying a process in accordance with the present invention.

A basic assembly for carrying out the $H_2S$ catalytic partial oxidation and sulfur recovery process preferably also includes, following the boiler, a sulfur condenser for further cooling the reacted gases and providing for the removal of liquid sulfur product, as illustrated in FIG. 3.

Referring again to FIG. 2, the catalyst device 47 is preferably in the form of one or more layers of wire gauze, a porous ceramic monolith, or a bed of particulates. The catalyst or catalyst device may be formed entirely of catalytic material, or one or more catalytic components may be supported on a non-catalytic, or relatively inactive refractory support, as described below in more detail. A catalyst device, or catalyst bed can also refer to a stack of one or more layers of catalyst or a packed bed of catalyst particles, for example. The catalyst device is configured so that only a first fraction of the feed gas mixture contacts the catalytically active surfaces of the catalyst device, while the balance of the reactant gas mixture serves to quickly cool the first fraction and prevent the oxidation reaction from proceeding too far. In the reactor, the catalyst device 47 is preferably held between two porous refractory disks 46, such as alpha-alumina.

The basic $H_2S$ catalytic partial oxidation and sulfur recovery process generally includes injecting $H_2S$-containing gas and $O_2$-containing gases, in a defined molecular ratio, and with rapid mixing, into the inlet of the reactor at a flow rate sufficient to ensure a catalyst contact time of no more than about is 200 milliseconds, preferably under 50 milliseconds, and more preferably less than 20 milliseconds. Less than 10 millisecond contact time is highly preferred. Preferably the gases are injected at superatmospheric pressure. The catalyst configuration and the flow rate are selected in such a way as to ensure a space velocity of at least about 20,000 hr$^{-1}$, preferably at least 100,000 hr$^{-1}$. Preferably the reactor is operated at a reactant gas pressure greater than 2 atmospheres, which is advantageous for optimizing gas desulfurization space-time yields.

The catalyst device is preferably configured so that only a first fraction of the feed gas mixture contacts the catalytically active surfaces of the catalyst, while the balance of the reactant gas mixture serves to quickly cool the first fraction and prevent the oxidation reaction from proceeding too far. After light off of the reaction, the reaction conditions are managed to encourage the partial oxidation reaction to proceed autothermally. After emerging from the catalyst bed the product gas stream enters the cooling tubes which are cooled by circulating water in a waste heat boiler, with the evolution of steam. The product stream is further cooled, to the dew point of elemental sulfur, or below, by a water cooled condenser. Pure elemental sulfur is collected from the condenser and the desulfirized product gas mixture may be recycled back into the system or routed to another process.

H$_2$S Partial Oxidation Catalysts

Catalysts that are active for catalyzing the direct partial oxidation of H$_2$S to elemental sulfur according to Reaction (4) are preferably in the form of one or more layers of wire gauze, a porous ceramic monolith, or a bed of discrete or divided structures. The catalyst device may be formed entirely of catalytic material, or it may comprise one or more catalytic components supported on a non-catalytic refractory support. Some suitable catalytic components that can be included in the metal of a gauze, or incorporated at its surface, or supported on a non-catalytic wire gauze, or other suitable refractory monolith or divided support, include platinum, rhodium, ruthenium, iridium, nickel, palladium, iron, cobalt, rhenium and rubidium, or a mixture of any of those metals. Platinum or rhodium, or especially a platinum-rhodium alloy, are preferred metals. Other catalytically active metals that may be included in the catalyst are vanadium, bismuth and antimony. Examples of catalytic metals deposited on refractory oxide supports include Pd—La$_2$O$_3$, Pt/ZrO$_2$ and Pt/Al$_2$O$_3$.

Metal Gauzes One type of catalyst is in the form of one or more layers of substantially planar, flexible woven metal-containing or metal-coated screen or gauze having about 20–120 mesh and diameter compatible with the inner diameter of the reactor. Suitable metals that may be formed into a gauze or deposited onto a non-catalytic gauze support include platinum, rhodium, ruthenium, iridium, nickel, palladium, iron, cobalt, rhenium and rubidium, or a mixture of any of those metals. Some of the more preferred gauze-type catalysts are made of about 87–93% by weight (wt %) Pt and about 7–13 wt % Rh (wt % based on total weight of the catalyst device). Alternative catalyst structures or devices may be in the form of one or more perforated disks, honeycomb-like structures, etched foils or any other suitably active structure that provides the desired gas flow rate to effect the desired partial oxidation.

Rh on a Ln-modified Refractory Support. Another type of catalyst that is active for catalyzing the direct partial oxidation of H$_2$S to elemental sulfur comprises about 0.005 to 25 wt % Rh, preferably 0.05 to 25 wt % Rh, and about 0.005 to 25 wt % of a lanthanide element (i.e., La, Ce, Pr, Nd, Pm, Sm, Eu, Gd, Tb, Dy, Ho, Er, Tm, Yb and Lu), preferably samarium, ytterbium or praseodymium, in the form of the metal and/or metal oxide coating a refractory monolith or a plurality of distinct or discrete structures or particulates. An especially preferred Rh-Ln catalyst contains about 0.5–10 wt % Rh and about 0.5–10 wt % Sm on a refractory support, especially where the ratio of rhodium to Sm is in the range of about 0.5–2. For example, an active H$_2$S partial oxidation catalyst is prepared by depositing Rh (e.g., 4–6 wt.%) onto a layer of Sm (e.g., 5 wt. %) that coats a partially stabilized (MgO) zirconia ("PSZ") monolith, which contains about 45–80 pores per linear inch. Weight percents (wt %) refer to the amount of metal component relative to the total weight of the catalyst, including the support, if any. Suitable PSZ monoliths are commercially available from Vesuvius Hi-Tech Ceramics Inc., Alfred Station, N.Y. Other monolith support structures or catalyst configurations include a disk with multiple perforations formed therethrough, a honeycomb-like structure, an etched foil and any other structure that provides the desired amount of transparency to permit the 200 millisecond or less contact time to effect the desired H$_2$S partial oxidation reaction. A discussion of catalyst structure and composition considerations for short contact time CPOX reactors can be found in U.S. Pat. No. 5,654,491 (Goetsch et al.), which is hereby incorporated herein by reference. As used herein, the term "about" or "approximately," when preceding a numerical value, has its usual meaning and also includes the range of normal measurement variations that is customary with laboratory instruments that are commonly used in this field of endeavor (e.g., weight, temperature or pressure measuring devices), preferably within ±10% of the stated numerical value. The terms "discrete" or "divided" structures or units refer to catalyst devices or supports in the form of divided materials such as granules, beads, pills, pellets, cylinders, trilobes, extrudates, spheres or other rounded shapes, or another manufactured configuration. Alternatively, the divided material may be in the form of irregularly shaped particles. Preferably at least a majority (i.e., >50%) of the particles or distinct structures have a maximum characteristic length (i.e., longest dimension) of less than ten millimeters, preferably less than five millimeters. The term "monolith" refers to any singular piece of material of continuous manufacture such as solid pieces of metal or metal oxide or foam materials or honeycomb structures. Two or more such catalyst monoliths may be stacked in the catalyst zone of the reactor if desired. In any case, the catalyst device, system or bed has sufficient porosity, or sufficiently low resistance to gas flow, to permit a stream of said reactant gas mixture to pass over the catalyst at a gas hourly space velocity (GHSV) of at least about 20,000 hr$^{-1}$, preferably at least 100,000 hr$^{-1}$, when the reactor is operated to recover elemental sulfur from an H$_2$S containing gas.

Pt—Rh Alloy. While many of the above-described catalyst compositions have demonstrated good activity for catalyzing the partial oxidation of H$_2$S, and are satisfactory for a number of SCPOX applications, some metals, such as Rh, suffer from deactivation with extended on stream use due to the formation of sulfur deposits and/or metal sulfide formation that removes the active catalytic form. The surprising discovery was made that this problem is greatly improved or solved completely by combining platinum with rhodium in the catalyst.

Pt—Rh Alloy on Ln-modified Refractory Support. An especially good catalyst that is highly stable and active for catalyzing the direct partial oxidation of high concentrations of H$_2$S in a gas stream to elemental sulfur and water contains both platinum and rhodium supported on a samarium-modified refractory support such as the above-described supports and materials. A highly preferred catalyst is prepared by depositing about 0.1%–6 wt % Pt onto about 3–6 wt % Rh, which was previously deposited onto an approximately 3–5 wt % lanthanide oxide, preferably samarium oxide, coated refractory support (wt % based on total weight of the supported catalyst). A preferred support is alumina granules, more preferably alpha-alumina. In the present investigations, the surprising synergy between the Pt and Rh components enhanced catalyst stability under SCPOX reaction conditions, and when further combined with a lanthanide or lanthanide oxide promoter provides an even better catalyst for syngas production. Catalyst stability refers to resistant to (a) deactivation due to carbon or sulfur deposition, (b) chemical reaction between sulfur and the catalytic components and (c) volatilization of precious metal at reaction conditions. The stability is typically shown by a consistent and reproducible catalytic performance (e.g., S yield with $H_2S$ feed or syngas yield with light hydrocarbon feed).

The above-described Pt—Rh based catalysts are preferably in the form of either a wire gauze, a foam monolith, or in the form of a catalytically active material dispersed or deposited on a refractory support containing zirconia, alumina, cordierite, titania, mullite, zirconia-stabilized alumina, MgO stabilized zirconia, MgO stabilized alumina, niobia or a mixture of any of those materials, or another suitable refractory material. For example, the catalyst can be structured as, or supported on, a refractory oxide "honeycomb" straight channel extrudate or monolith, made of cordierite or mullite, or other configuration having longitudinal channels or passageways permitting high space velocities with a minimal pressure drop. Such configurations are known in the art and described, for example, in *Structured Catalysts and Reactors*, A. Cybulski and J. A. Moulijn (Eds.), Marcel Dekker, Inc., 1998, p. 599–615 (Ch. 21, X. Xu and J. A. Moulijn, "Transformation of a Structured Carrier into Structured Catalyst"), which is hereby incorporated herein by reference.

A more preferred catalyst geometry comprises granules prepared by impregnating or washcoating the catalytic components, or their precursors, onto lanthanide coated refractory granules, calcining and reducing the catalyst, using techniques that are well known in the art. A catalyst bed for a the $H_2S$ catalytic partial oxidation process may comprise a quantity of such impregnated or coated granules, or other forms of support such as beads, pills, pellets, cylinders, trilobes, extrudates, spheres, other rounded shapes or other manufactured configurations, or irregularly shaped particles. The supports preferably comprise a refractory material such as zirconia, alumina, cordierite, titania, mullite, zirconia-stabilized alumina, MgO stabilized zirconia, MgO stabilized alumina, niobia or a mixture of any of those materials, or another suitable refractory material. Alumina is preferably in the form of alpha-alumina, however the other forms of alumina have also demonstrated satisfactory performance.

The apparent synergy between Pt and Rh in the catalyst that enhances catalyst stability under SCPOX reaction conditions was also observed under CPOX reaction conditions. The Pt-Rh/Ln catalyst also has superior activity for converting an $H_2S$ stream containing a light hydrocarbon, such as methane, to elemental sulfur and synthesis gas, by way of concurrent CPOX and SCPOX reactions carried out over the same catalyst in a single reaction zone, operating the reactor at hydrocarbon, $H_2S$ and $O_2$ concentrations and process conditions that favor the formation of both sulfur, CO and $H_2$, as described in co-owned U.S. patent application Ser. No. 09/742,999 (U.S. Pat. No. 6,579,510) and U.S. patent application Ser. No. 09/625,710, abandoned, each of which is hereby incorporated herein by reference.

Carbided Pt/Rh on a Refractory Support. Another unexpected discovery was that the gradual deactivation of rhodium, and others among the above-described SCPOX catalysts, was also improved by carbiding the catalyst under gaseous hydrocarbon flow before, after or during the $H_2S$ flow, under CPOX-promoting reaction conditions. An especially active catalyst that provides improved performance for converting $H_2S$ to sulfur by direct oxidation (the $H_2S$ partial oxidation process) is prepared by carbiding a Pt—Rh catalyst.

The carbiding process includes exposing the catalyst, in any of the forms described above, to light hydrocarbon (preferably methane, ethane or propane) under CPOX reaction conditions as described in U.S. patent application Ser. No. 09/625,710, abandoned. Preferably this hydrocarbon pre-treatment procedure (referred to herein as "carbiding") is carried out with the catalyst in place in the short contact time reactor. The carbiding treatment includes heating the catalyst to at least 700° C. or up to about 1,500° C., preferably in the range of 850° C.–1,300° C., in th presence of the light hydrocarbon. Upon getting the catalyst up to CPOX operating temperature the flow of hydrocarbon is stopped and the flow of $H_2S$ containing gas is begun for sulfur removal and recovery under SCPOX operating conditions. It is preferable to perform the carbiding treatment before exposing the catalyst to $H_2S$ or other sulfur compound while the catalyst is at a temperature at which it can chemically react with sulfur or at which sulfur can condense on its active sites. In the carbiding treatment, it is preferable to mix the hydrocarbon with a small amount of oxygen or $O_2$-containing gas to deter or minimize coking of the catalyst during treatment. The amount of oxygen preferably does not exceed the stoichiometric amount necessary to support catalytic partial oxidation of the hydrocarbon (CPOX reaction), i.e., a carbon:oxygen molar ratio of 2:1. If the catalytic components are also active for catalyzing the CPOX reaction, production of synthesis gas (CO and $H_2$) may commence during the pre-treatment step upon reaching a temperature sufficient to initiate the reaction. Without wishing to be bound by any particular theory, it is believed that, in the case of a Pt—Rh alloy catalyst, the formation of Rh and/or Pt carbide in which at least a substantial portion of the catalytic metal component exists in the same phase with carbon (e.g., $RhC_x$ or $PtC_x$), which resists the formation of metal sulfide(s) that can deactivate the catalyst by covering the active centers. Thus, the stability and life of the catalyst on $H_2S$ stream is increased or enhanced by the carbiding treatment.

Catalyst Performace for $H_2$ Catalytic Partial Oxidation Process

TABLE 1

Catalyst Performance for $H_2S$ Catalytic Partial Oxidation Process

|  | Catalyst composition | $H_2S$ flow (ml/min) | Air flow (ml/min) | $N_2$ flow (ml/min) | $H_2S$ conversion (%) | S yield (%) | $SO_2$ yield (%) | Cause of deactivation |
|---|---|---|---|---|---|---|---|---|
| Without carbiding | 3.9% Rh, 5.1% Sm on 80-ppi alpha-alumina | 633 | 1519 | 900 | 75.7 | 63.9 | 11.8 | Sulfur formation on the catalyst |
|  |  | 892 | 2141 | 900 | 78.4 | 65.8 | 12.7 |  |
|  |  | 1140 | 2736 | 900 | 79.7 | 65.9 | 13.8 |  |

TABLE 1-continued

Catalyst Performance for H₂S Catalytic Partial Oxidation Process

| | Catalyst composition | H$_2$S flow (ml/min) | Air flow (ml/min) | N$_2$ flow (ml/min) | H$_2$S conversion (%) | S yield (%) | SO$_2$ yield (%) | Cause of deactivation |
|---|---|---|---|---|---|---|---|---|
| | foam (1 gram total weight) | 1640 | 3936 | 1000 | 79.0 | 62.6 | 16.4 | (shown by SEM analysis) |
| With carbiding (Propane) | 4.2% Rh, 5.2% Sm on 80-ppi alpha-alumina foam (1 gram total weight) | 1195<br>2195 | 4768<br>5265 | 0<br>0 | 82.2<br>82.7 | 69.4<br>69.7 | 12.9<br>13.0 | No deactivation for the run duration (6 hours) |
| With carbiding (Methane) | 0.5% Pt, 5% Rh, 5% Sm on 1/16" alpha/gamma-alumina extrudates (2 grams total weight | 761<br>1520 | 1755<br>3498 | 0<br>0 | 82.4<br>82.6 | 72.4<br>71.3 | 10.0<br>11.3 | No deactivation for the run duration (10 hours) |

Note: S and SO2 yields are calculated as the product of H2S conversion and S or SO$_2$ selectivity respectively. Nitrogen addition for the non-carbided catalyst was needed to lower the catalyst temperature.

Comparing the performance of the catalysts shown in Table 1, it can be seen that after carbiding a representative monolith supported Rh/Sm catalyst, superior S yield and catalyst stability was obtained despite increasing the flow rates by 100–200%. Without wishing to be bound by any particular theory, it is believed that the formation of metal carbide prevented the formation of sulfur or sulfide species on the catalyst. This, in turn, kept the active components from getting deactivated, and improved the partial oxidation of H2S to elemental S. Combining Pt with Rh on Sm coated extrudates provided comparable conversion and selectivity and provided even longer life on stream without sulfur deactivation or coking.

EXAMPLE 1

Petroleum Hydrotreater

Figure 1:
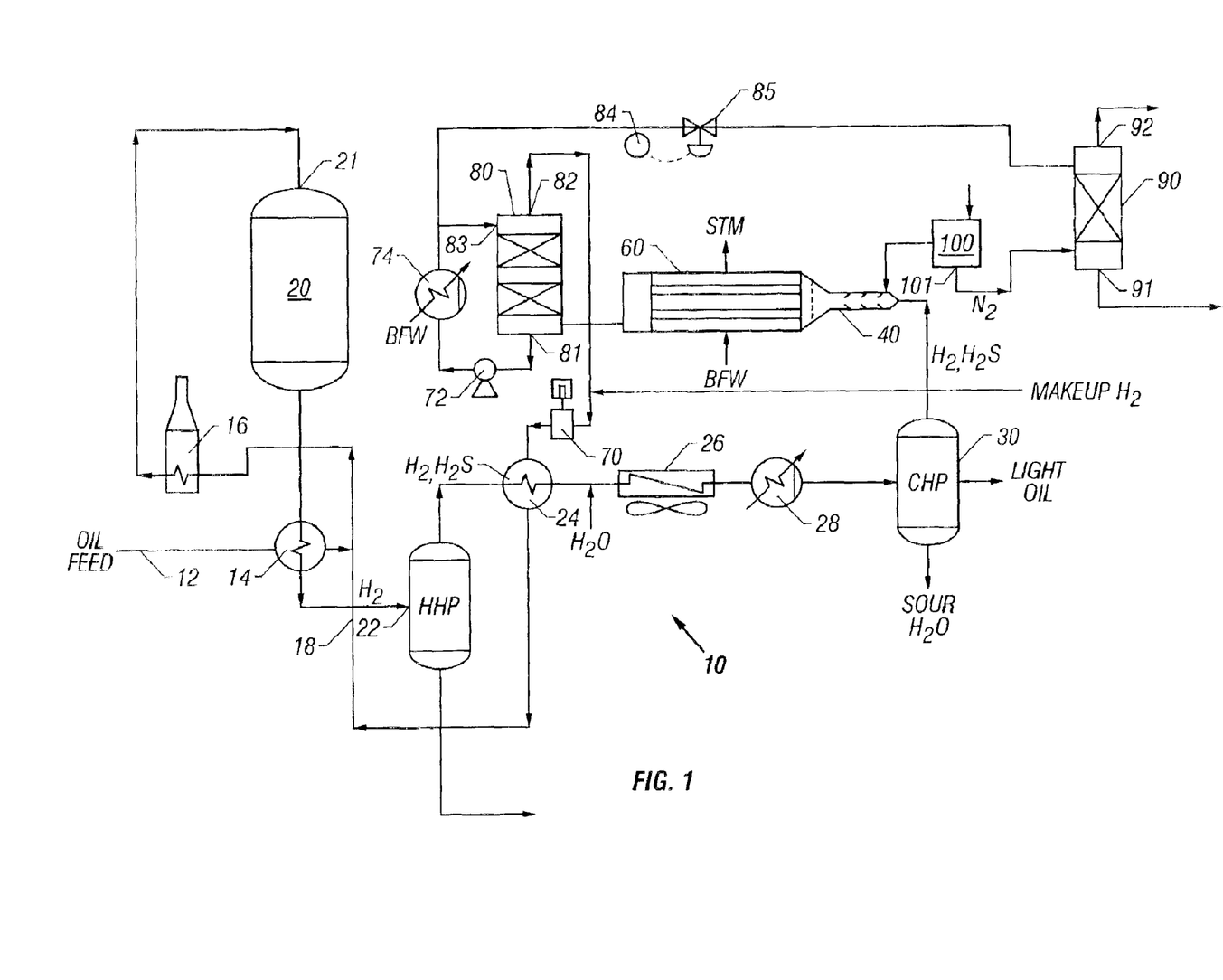
FIG. 1 is a schematic flow diagram for one embodiment of a system employing the $H_2S$ recovery process of the present invention.

A refinery hydrodesulfurization (HDS) plant is used to illustrate one embodiment of an improved sulfur removal system and process. The new process for H$_2$S conversion can also be used with a feedstock consisting of practically any gas containing H$_2$S, and the new sulfur removal unit may be placed in-line with many other compatible systems which require a H$_2$S removal step. Referring to FIG. 1, a flow diagram of a preferred embodiment of a refinery hydrodesulfurizer (HDS) or hydrotreater system is shown. HDS system 10 generally includes oil feed inlet 12, feed/effluent heat exchanger 14, charge heater 16, hydrodesulfurization reactor 20, hot high pressure (HHP) separator 22, hydrogen heat recovery unit 24, air cooler 26, water cooler 28, cold high pressure (CHP) separator 30, short contact time reactor 40, waste heat boiler 60, recycle H$_2$ compressor 70, sulfur condenser 80, sulfur degassing drum 90 and air separator 100. A basic HDS plant configuration, such as that described by J. H. Gary et. al. in Petroleum Refining Technology and Economics, 1994, Dekker, pg. 18, FIG. 9.1, may be improved as described herein.

FIG. 2 shows a preferred configuration of the interior of a short contact time reactor 40, designed for sulfur recovery by the catalytic partial oxidation of H$_2$S to sulfur and water. A detailed description of the considerations involved in operating a reactor using extremely short contact times is given in U.S. Pat. No. 5,654,491, which is incorporated herein by reference. Generally, the present reactor is a tube or vessel made of materials capable of withstanding the high temperatures (e.g., 700° C.–1,500° C.) generated by the catalytic partial oxidation reaction of equation (4). Inside the reactor one or more very thin catalyst devices 47, such as wire gauze or a metal coated porous monolith are placed in the cross section of the vessel. This thin catalyst structure, together with operation of the process (described in more detail below) at very high space velocity, ensures that the catalyst is in contact with the reactant gases for a very short time, the partial oxidation reaction generally going to completion in about 1–200 milliseconds. A radiation shield 46 is placed in front of the catalyst device 47 to prevent heating the reactants before entering the reaction zone 45 and contacting the catalyst. The radiation shield is preferably a very porous refractory material capable of withstanding the temperatures of the reaction (i.e., up to about 1,500° C.) and is able to sufficiently insulate the relatively cool feed gas mixture at a temperature of about 40–350° C., preferably no more than 200° C., from the hot reaction zone 45.

Referring still to FIG. 2, reactor 40 generally includes H$_2$/H$_2$S gas feed injection inlet 43, O$_2$ inlet channel 41, conduit 58, mixing zone 48, reaction zone 45 and cooling zone 55. Mixing zone 48 includes conduit 58, which extends between inlet 43 and conduit exit 44, reactant gas chamber 49, and static mixer 50, which may be a group of vanes 51 projecting from the walls of a concentric perforated pipe 52 within conduit 58. Mixing zone 48 and reaction zone 45 are preferably formed from or lined with a suitable refractory material 53. Reaction zone 45 preferably also includes a thermal radiation barrier 46 positioned immediately upstream of catalytic device 47. Radiation barrier 46 is preferably a porous ceramic or other refractory material that is suited to withstand the operating temperatures and, the preferred superatmospheric pressures of the process, and to provide sufficient thermal insulation to the reactant gas mixture upstream from the reaction zone 45. Such refractory materials are well known and described, for example, in U.S. Pat. No. 4,038,036 (Beavon), the disclosure of which is incorporated herein by reference.

Catalytic device 47 is preferably in the form of a fixed layer or layers of wire gauze, a porous monolith, or a packed bed of divided material. Preferred operating conditions for the reactor are described below.

Adjacent reaction zone 45 is cooling zone 55, which includes ceramic ferrules 56 A embedded in refractory material 53 and a tube sheet 54 containing a plurality of thermally conductive tubes 61. The tube sheet 54 also serves as a divider between the process gas and the boiling water at the inlet 62 to the waste heat boiler 60. The tubes 61 and tube sheet 54 are preferably made of carbon steel. The tube sheet forces the process gas to go through the inside of the tubes. Boiling water, contained by the shell of the heat exchanger surrounds the outside of the tubes 61. Since the carbon steel of the tubes and tube sheet cannot stand the temperatures of the process gas, temperature protection for the metal in both is needed. In tubes 61 and for most of the tube sheet 54, this protection is afforded by the boiling water. Since the boiling water remains at a constant temperature, and since the metal conducts heat so readily, the tubes and most of the tube sheet 54 attain temperatures only slightly above the temperatures of the boiling water (i.e., about 100° C.). This is not the case for the part of the tube sheet 54 where the tubes 61 connect at joints 59. Without thermal protection, these joints 59 and the first part of the tube will see temperatures far exceeding the safe operating limits for the metal. The refractory covering and ceramic ferrules (tube inserts) provide insulation for these relatively unprotected areas of metal. Thus, only metal surfaces that are adequately exposed to the boiling water will encounter the hottest gases.

Tubes 61 extend into waste heat boiler 60, which is preferably similar to a conventional boiler. Sequentially in line following waste heat boiler 60 are pump 72, liquid sulfur heat exchanger 74 and sulfur quench tower or condenser 80, which has a liquid sulfur outlet 81, a $H_2$ gas outlet 82 and a sulfur vapor inlet 83. Following heat exchanger 74 are pump 84 and pressure controller 85, after which is sulfur degassing drum 90. Drum 90 includes sulfur recovery outlet 91 and degassing vapor outlet 92. In line following $H_2$ gas outlet 82 is recycle $H_2$ compressor 70 and $H_2$ heat recovery unit 24.

Air separator 100 is in communication with oxygen inlet 41 of reactor 40 and has a residual gas outlet 101 which also connects with drum 90. The air separator takes air and separates it into oxygen and nitrogen of varying purity. Enriching the oxygen content of the oxidizing stream fed to the new process reduces the amount of inert nitrogen introduced into the process. Nitrogen fed with the oxygen will accumulate in the process gas and will necessitate some process stream purification to remove the nitrogen. The air separator is optional, but is preferred in most cases. There are many options for configuring an HDS unit. For example, some do not have feed furnaces, some do not have multiple stage separation, some have even more stages of separation, some have internal hydrogen compression, others have hydrogen fed to them by other units. It can be readily appreciated that the basic short contact time reactor assembly and the $H_2S$ catalytic partial oxidation and sulfur recovery process may be advantageously incorporated into any of a variety of HDS plant configurations and processes.

According to the configuration illustrated in FIG. 1, in operation, an oil stream that includes sulfur-containing oil compounds is fed into HDS reactor 20. The incoming oil feed is pre-heated at the same time the HDS effluent is cooled in heat exchanger 14. A hydrogen gas stream is also fed into HDS reactor 20 via $H_2$ inlet 21. Charge heater 16 can either heat the oil, hydrogen, or combination of both before they are fed to the reactor. In HDS reactor 20 the hydrogen gas reacts with the sulfur-containing compounds in the oil to form $H_2S$ by removing the sulfur from the oil molecules, as in a conventional HDS plant such as that described by J. H. Gary et. al. in Petroleum Refining Technology and Economics, 1994, Dekker, p. 188 (see FIG. 9.1 of that reference). After cooling the reactor effluent in heat exchanger 14, the hydrogen and $H_2S$ gas mixture is separated from the desulfurized oil in hot high pressure (HHP) separator 22, and the gas mixture is cooled in heat recovery exchanger 24 (in conjunction with heating of recycled and/or makeup $H_2$ in route to the HDS reactor). The $H_2/H_2S$ gas is then cooled in air cooler 26 and water cooler 28 before entering cold high pressure (CHP) separator 30. Desulfurized light oil and sour $H_2O$ are removed from CHP separator 30 and the mixed $H_2$ and $H_2S$ stream is routed to the short contact time reactor 40. Referring to FIG. 2, oxygen enters reactor 40 via oxygen inlet conduit 41 and is mixed with the $H_2/H_2S$ stream by mixer 50 within mixing zone 48. Air, or an oxygen enriched air stream could also be used. Although not required, nearly pure oxygen is preferred as it helps in maintaining the recycle hydrogen purity and in preventing the buildup of inert gases such as nitrogen and argon in the system. System 10 preferably includes an air separator 90 to provide a high $O_2$ content oxygen stream and to remove undesired gases such as $N_2$, which are sent to a sulfur degassing drum 80 for disposal. Alternatively, a purified oxygen feed may be substituted. The mixer 42 preferably evenly distributes the $O_2$ across the entire cross section of the mixer exit conduit 44. This prevents unwanted side reactions and temperature excursions in the reaction zone 45. The $H_2S$-containing stream may contain only a trace amount of $H_2S$, a small amount (e.g., 0.5–1 vol. %), more than 3–25 vol. % $H_2S$, up to 40 vol. % (as in some natural gas reserves, for example), or can even consist of a 100% $H_2S$ stream. Preferably the temperature of the reactant gas mixture is at least about 200° C. to facilitate initiation of the reaction. The mixing of the gases must be very thorough to prevent combustion reactions from taking place or predominating in the reaction zone to form $SO_2$. Also, the contact time between the oxygen and $H_2S$ is minimized to prevent having a stagnant explosive mixture form in the reactor. Minimum contact time between the $O_2$ and $H_2S$ can also be facilitated by placing inert filler in the void spaces in the piping upstream of the catalytic section or reaction zone.

The stoichiometric amount of oxygen required to convert the $H_2S$ according to the reaction $$H_2S + \tfrac{1}{2}O_2 \rightarrow 1/xS_x + H_2O\,(x=2,\,6,\,\text{or}\,8)$$

is provided to the reactor to deter or prevent temperature excursions, unwanted side reactions, and excessive $H_2S$ in the product gas stream. Preferably the $O_2:H_2S$ molar ratio is about 0.5; however, it is also desirable to keep the reactor temperature above 700° C., preferably between 850° C. and 1,300° C., to keep the catalyst from combining with sulfur permanently. In certain circumstances where the $H_2S$ content of the feed is too low for the partial oxidation of the $H_2S$ to provide sufficient heat, additional $O_2$ is added to partially oxidize a small portion of hydrogen or hydrocarbon and thereby generate the additional heat necessary. Alternatively, additional heat may be provided to the catalyst by one or more external heaters.

Referring still to FIG. 2, from mixing zone 48 of reactor 40, the reaction mixture fills reactant gas chamber 49 and passes through thermal radiation shield 46. The radiation shield 46 prevents pre-ignition of the reaction mixture before entering the reaction zone 45 and contacting catalyst device 47. Pre-ignition would cause unwanted side reactions and potentially an overpressure of the reactor vessel. As described above, catalyst device which is contacted by the reactant gas mixture is preferably one or more layers of gauze made of thin metal wires, or made of metal deposited on a metal or refractory ceramic support or monolith. The configuration of the catalyst device must be such that the contact time between the reactant gas mixture and the catalyst is no more than about 200 milliseconds, preferably under 50 milliseconds, and more preferably less than 20 milliseconds. Ten milliseconds or less contact time is highly preferred. This very brief gas residence time on the catalyst is important to minimize or eliminate the formation of $SO_2$ that would restrict the recovery of sulfur by establishing the Claus equilibrium of equation (3). Preferably the flow of the reactant and product gases is maintained at a rate sufficient to provide a GHSV of at least about 100,000 hr$^{-1}$. The process is operated at atmospheric or superatmospheric pressures, the latter being preferred. The pressures may be from about 100 kPa to about 12,500 kPa, preferably from about 130 kPa to about 10,000 kPa.

The catalytic components of the catalyst device catalyze the partial oxidation of the $H_2S$ directly to sulfur. The overall reaction is:

x=2, 6, or 8. Maintaining an optimum dwell time range of reactant gases on the catalyst produces a favorable balance between temperature elevation due to the exothermic partial oxidation reaction and the convective removal of heat from the reactor by the rapidly moving product gas stream. Thus, sufficient heat is generated to maintain the catalyst in the range of about 700° C.–1,500° C., preferably in the range of about 850° C.–1,300° C. The temperature measured at the reactor outlet is preferably also in the same range. The temperature of the reaction is controlled by regulating the preheat temperature and the oxygen feed rate. It is desirable to quickly cool the reaction mixture and condense the sulfur out of the stream to prevent the re-formation of $H_2S$ by the reaction:

This rapid cooling is accomplished by passing the reacted gas mixture into cooling zone 55. The product gas stream enters cooling tubes 56, which are located between ferrules 53 and which extend into channels 61 of waste heat boiler 60, immediately downstream from the reaction zone 45. Tubes 56 within channels 61 are cooled by circulating water which evolves from boiler 60 as steam. The product stream entering tubes 56 is further cooled to the dew point of elemental sulfur, or below, by a water cooled condenser or boiler 60 immediately downstream of the reaction zone 55. The temperature of the cooled gas/liquid sulfur, $H_2$, and $H_2S$ leaving boiler 60 is preferably above the dewpoint of the sulfur in the gas, but no less than about 125° C. This is followed by condensation of the elemental sulfur in a contact condensing device 80, as shown in FIG. 1. Ideally, the outlet of condenser 80 operates at a temperature close to the freezing temperature of elemental sulfur, i.e., about 250° F. (121° C.), to keep the amount of elemental sulfur vapor in the gas leaving condenser 80 to a minimum. Precautions such as steam jacketed piping are desired in the final product piping until the stream is reheated by the gas stream from the condenser. From the sulfur condenser 80 the liquid sulfur product is pumped to sulfur degassing drum 90, where the liquid sulfur is drawn off and the residual vapor is sent to an incinerator. The hydrogen recycle compressor 70 sends unreacted hydrogen and makeup hydrogen from an external source back to the HDS reactor 20. At heat recovery exchanger 24 the recycle hydrogen picks up heat from the HHP effluent gas as an energy conservation measure.

A refinery hydrodesulfurization plant is used only to depict one embodiment of an improved sulfur removal system. The new process for $H_2S$ conversion can also be used on any gas containing $H_2S$. For example, in the refining industry a conventional desulfurizer, catalytic cracker, coker, or other type of refining process may be modified by substituting the new $H_2S$ partial catalytic oxidation process in place of a Claus-type process; or in the natural gas industry the new process might be used to purify the gas emitted from a natural gas well. The new process may also be employed in cleaning up residual gas from coal liquefaction processes and arising from metal smelting for the production of steel.

An advantage of employing the above-described short contact time partial oxidation process instead of a conventional partial oxidation method is that greater concentrations of $H_2S$ in the reactant stream can be processed by the new method than has generally been possible with known processes. The catalytic partial oxidation of hydrogen sulfide has been shown by the present inventor in co-assigned applications Ser. Nos. 09/625,710, abandoned and 09/624, 715 (U.S. Pat. No. 6,403,051) to be useful for improving synthesis gas production and for concurrently producing hydrogen gas. The disclosures of those applications are incorporated herein by reference.

While in the particular case of the hydrotreater plant shown in FIG. 1, any elemental sulfur carried away with the hydrogen gas from sulfur condenser 80 would be converted to $H_2S$ in the desulfurizer reactor 20, in other processes the inline sulfur recovery unit (comprising a short contact time reactor and condenser) would preferably be placed in line in the process in such a way that a hydrogenation catalyst bed can convert the elemental sulfur in the product gas into $H_2S$. This small amount could then be absorbed and desorbed from a solid bed, converted to sulfur in a liquid or solid redox system (e.g. chelated iron, iron oxide, zinc oxide, sodium nitrite), or removed by basic aqueous solutions (e.g. caustic, alkanolamines). Residual $H_2S$ removed using alkanolamine chemistry can be recycled back to the inline sulfur recovery unit much as a hydrogenation/amine (Shell SCOT or Parsons BSR/MDEA) produces a recycle $H_2S$ stream to the front end of a conventional Claus sulfur recovery plant. This would prevent the unwanted deposition of elemental sulfur in the process unit.

EXAMPLE 2

Purification of a Natural Gas Stream Containing $H_2S$

Referring to FIG. 3, a diagram of a preferred embodiment of a natural gas desulfurizing system 100 is shown. System 100 generally includes a short contact time reactor 140 with a natural gas stream inlet 143, an $O_2$ inlet 141, a heat exchanger such as waste heat boiler 160, and sulfur condenser 180. Reactor 140 is like reactor 40 described in Example 1 and shown in FIG. 2. Following waste heat boiler 160 is sulfur condenser 180, which has a liquid sulfur outlet 181 and a desulfurized gas outlet 182.

In operation, a natural gas stream that contains a quantity of $H_2S$ and an $O_2$-containing stream are injected into inlets 143, 141, respectively. Apparatus that is well known in the art for injecting gas into short contact time reactors at high flow rates is employed to feed the reactant gases at atmospheric or superatmospheric pressure. Oxygen entering reactor 140 via inlet 141 is mixed with the $H_2S$/natural gas stream in mixing zone 148. Air, or an oxygen enriched air stream could also be used; however, substantially pure oxygen is preferred as it prevents the inclusion of inert gases such as nitrogen and argon in the system. A mixer (such as static mixer 50 depicted in FIG. 2) evenly distributes the $O_2$ across the entire cross section of reactant gas conduit 144. Thorough mixing deters the occurrence of unwanted side reactions and temperature excursions in the reaction zone 145, as discussed in Example 1.

As in Example 1, care is preferably taken to provide to the reactor no more than an approximately stoichiometric amount of oxygen to support the reaction $H_2S+\frac{1}{2}O_2 \rightarrow 1/x\ S_x+H_2O$ (x=2, 6, or 8). In order to minimize combusting or partially oxidizing the hydrocarbon constituents of the natural gas stream and to promote the selective oxidation of $H_2S$ to sulfur, short catalyst contact time, favorable catalyst composition, and restriction of the $O_2$ feed are employed. Although not wishing to be limited to any particular theory or interpretation, it is suggested that, under the aforesaid controlled conditions, significant oxidation of the hydrocarbon components of the reactant gas mixture will not occur because the short contact time (i.e., no more than about 200 milliseconds) does not give the hydrocarbons sufficient time to break apart to form coke or tar. By exercising care in selecting the catalyst composition, catalyst materials that have significant activity for catalyzing hydrocarbon reactions under the $H_2S$ partial oxidizing conditions described above are avoided. For example, platinum is a better catalyst choice because most hydrocarbon reactions catalyzed by platinum are poisoned by the presence of sulfur. It has been demonstrated by others in an experiment where $H_2$, $H_2S$, and molecular oxygen were passed over platinized clay, that only the hydrogen from the $H_2S$ combined with oxygen because the platinum helped to dissociate the $H_2S$, likely activating the hydrogen for its reaction with oxygen (Mellor, J. W., A Comprehensive Treatise on Inorganic and Theoretical Chemistry, Vol. X, p. 118, 119, 128, 129 (Longmans, Green and Co., London, 1939). By contrast, most of the conventional $H_2S$ direct oxidation processes employ metal oxide catalysts or supports that may have some acidic character which tends to help catalyzation of hydrocarbon cracking and dehydrogenation reactions, leading to coke or tar formation. Also, it is preferred that insufficient $O_2$ is fed to the reaction zone to partially oxidize any $H_2$ or hydrocarbon in the $H_2S$-containing feed. Only enough $O_2$ is provided to partially oxidize $H_2S$ to elemental sulfur and $H_2O$.

When referring to a wire gauze catalyst, the contact time may be calculated as the wire diameter divided by the feed gas stream velocity at inlet conditions (i.e., temperature and pressure at the inlet to the reactor). When employing a catalyst monolith or packed bed of divided catalyst, the surface area, depth of the catalyst bed, and gas flow rate (space velocity) are preferably managed to ensure the desired short contact time (i.e., less that 200 milliseconds preferably under 50 milliseconds, more preferably less than 20 milliseconds, and still more preferably 10 milliseconds or less). It is well known that contact time is inversely proportional to the "space velocity," as that term is customarily used in chemical process descriptions, and is typically expressed as volumetric gas hourly space velocity in units of $hr^{-1}$.

Referring still to FIG. 3, from mixing zone 148 of reactor 140, the reaction mixture fills mixing chamber 149 and passes through thermal radiation shield 146. The radiation shield 146 prevents pre-ignition of the reaction mixture before entering the reaction zone 145 and contacting catalyst device 147. Since pre-ignition causes unwanted side reactions and potentially an overpressure of the reactor vessel, rapid mixing of the gases and avoidance of dead spaces or gas stagnation areas are important considerations in reactor design and operation. As described above, the catalyst device 147 which is contacted by the reactant gas mixture is preferably one or more layers of gauze made of thin metal wires, or made of metal deposited on a metal or refractory ceramic support or monolith. The configuration of the catalyst device is preferably such that the contact time between the reactant gas mixture and the catalyst is in the range of about 0.1 to 200 milliseconds. This very brief gas residence time on the catalyst is important to minimize or eliminate the formation of $SO_2$ that would restrict the recovery of sulfur by establishing the Claus equilibrium of equation (3). Preferably the flow of the reactant and product gases is maintained at such a rate that the $H_2S$ partial oxidation process is carried out at superatmospheric pressure (i.e., greater than 1 atmosphere, preferably >2 atmospheres), and the gas hourly space velocity is at least 20,000 $hr^{-1}$, preferably at least 100,000 $hr^{-1}$. As described above, the catalytic surfaces of the device catalyze the partial oxidation of the $H_2S$ directly to sulfur. Maintaining an optimum dwell time range of reactant gases on the catalyst produces a favorable balance between temperature elevation due to the exothermic partial oxidation reaction and the convective removal of heat from the reactor by the rapidly moving product gas stream. Thus, sufficient heat is generated to maintain the catalyst temperature in the range of approximately 700° C.–1,500° C., preferably 850° C.–1,300° C. The temperature is maintained in the desired range by preheating the reactants, by heat exchange, and/or by supplying heat to the catalyst with a direct fired in-line heater, as necessary. The platinum catalyst, or another suitable catalyst composition, is selective to accelerating the decomposition of $H_2S$ and to ignition of the hydrogen with oxygen. Since only the oxidization of $H_2S$ is desired, the shortage of $O_2$ is expected by the inventor to also help the selectivity. It has been previously suggested in the literature that platinum is not a very good catalyst for the syngas formation reaction. Lack of $O_2$ and the short contact time/rapid cooling should also leave the light hydrocarbon constituents ($C_2$–$C_5$) intact. The temperature measured at the reacted gas outlet is preferably about 700° C.–1,500° C., more preferably 850° C.–1,500° C.

Still referring to FIG. 3, the reaction is rapidly quenched and the rapidly flowing reacted gases or effluent exiting the reaction zone 145 is quickly cooled by passing into cooling zone 155. The effluent gases enter cooling tubes (like tubes 61 shown in FIG. 2) via ceramic ferrules embedded in refractory material, and flow through waste heat boiler 160, immediately downstream from reaction zone 145. The gases are cooled by the circulating water in boiler 160. The partially cooled gaseous product stream then flows into sulfur condenser 180 where the gases are further cooled to the dew point of elemental sulfur, or below, by a water cooled condenser 180. Ideally, the outlet 181 of condenser 180 operates at a temperature close to the freezing temperature of elemental sulfur, i.e., about 250° F. (121° C.), to keep to a minimum the amount of elemental sulfur vapor in the desulfurized natural gas leaving condenser 180. Under optimal processing conditions the resulting desulfurized natural gas stream is sufficiently free of $H_2S$ to be suitable for routing directly to another application, such as a syngas production facility, for example. The elemental sulfur is recovered from the condenser 180.

In an alternative situation, where the $H_2S$ content of a gas stream is relatively high, the $H_2$ or light hydrocarbon content is relatively low, and it is not considered desirable or feasible to recover the non-$H_2S$ components, it may be preferred to instead employ the system and process described in the inventor's concurrently filed U.S. patent application Ser. No.

10/024,167 filed Dec. 18, 2001, U.S. Pat. No. 6,800,269, entitled "Short Contact Time Catalytic Sulfur Recovery System for Removing $H_2S$ from a Waste Gas Stream." The disclosure of that application is hereby incorporated herein by reference.

In another alternative situation, in which the desulfurized natural gas product is intended for use in the production of synthesis gas, it may be preferable to instead convert the $H_2S$-containing natural gas stream directly to elemental sulfur and synthesis gas, by way of concurrent CPOX and SCPOX reactions carried out in a single reaction zone over a catalyst that is active for promoting both types of partial oxidation reactions. In that case, the reactor is operated at hydrocarbon, $H_2S$ and $O_2$ concentrations and process conditions that favor the formation of both sulfur, CO and $H_2$, as described in co-owned U.S. patent application Ser. No. 09/742,999 (U.S. Pat. No. 6,579,510) and Ser. No. 09/625,710, abandoned, each of which is hereby incorporated herein by reference.

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims. Each and every claim is incorporated into the specification as an embodiment of the present invention. Thus the claims are a further description and are an addition to the preferred embodiments of the present invention. Use of the term "optionally" with respect to any element of a claim is intended to mean that the subject element is required, or alternatively, is not required. Both alternatives are intended to be within the scope of the claim. The discussion of a reference in the Description of Related Art is not an admission that it is prior art to the present invention, especially any reference that may have a publication date after the priority date of this application. The disclosures of all patents, patent applications and publications cited herein are hereby incorporated herein by reference, to the extent that they provide exemplary, procedural or other details supplementary to those set forth herein.

What is claimed is:

1. A process of removing $H_2S$ from an $H_2S$-containing gas stream comprising:

forming a reactant gas mixture comprising said $H_2S$-containing gas and $O_2$;

maintaining the temperature of said reactant gas mixture greater than the dew point of elemental sulfur, flowing a stream of said reactant gas mixture over a catalyst device in a reaction zone such that the contact time of each portion of reactant gas mixture that contacts said catalyst device is less than 200 milliseconds, whereby the reaction $H_2S+\frac{1}{2}O_2 \rightarrow 1/x\ S_x+H_2O(x=2, 6\ or\ 8)$ occurs, forming a product stream comprising gaseous elemental sulfur and water;

passing said product stream into a cooling zone and cooling said product stream to the dewpoint temperature of elemental sulfur, or lower, such that sulfur is condensed from said product stream; and recovering said condensed elemental sulfur from said cooling zone.

2. The process of claim 1 wherein said $H_2S$-containing gas stream comprises another gaseous component, and the process comprises recovering said other gaseous component from said product stream.

3. The process of claim 1 wherein said step of flowing a stream of said reactant gas mixture over a catalyst in a reaction zone at a temperature greater than the dew point of elemental sulfur includes keeping the temperature of the catalyst device and/or the reactant gas mixture sufficiently high to deter or prevent sulfur poisoning of said catalyst device.

4. The process of claim 1 comprising providing a millisecond contact time reactor having a gas mixing zone, a reaction zone capable of withstanding temperatures up to at least 1,500° C., and a cooling zone, wherein said step of forming a reactant gas mixture comprises providing a $H_2S$-containing gas stream comprising up to 100% $H_2S$, and, optionally, another gaseous component, and providing a $O_2$-containing gas stream; and wherein said step of flowing a stream of said reactant gas mixture over catalyst in a reaction zone comprises mixing together said $H_2S$-containing gas stream and said $O_2$-containing gas stream in said mixing zone to form a stream of reactant gas mixture, said reaction zone containing a catalyst device having activity for catalyzing the direct partial oxidation of $H_2S$ to elemental sulfur and water; maintaining the temperature of said mixing and reaction zones above the dewpoint of sulfur; and forming a product stream comprising gaseous elemental sulfur, and, optionally, said other gaseous component; and wherein, said process optionally includes recovering said other gaseous component from said product stream.

5. The process of claim 4 comprising maintaining an approximately 2:1 molar ratio of $H_2S$ to $O_2$ in said reactant gas mixture.

6. The process of claim 4 comprising keeping the temperature of said catalyst device at about 700° C.–1,500° C.

7. The process of claim 4 wherein said step of providing a $H_2S$-containing gas stream comprises providing an $H_2S$-containing light hydrocarbon stream; and said process further comprises recovering an at least partially desulfurized light hydrocarbon stream.

8. The process of claim 4 wherein said step of providing a $H_2S$-containing gas stream comprises providing an $H_2/H_2S$-containing gas stream; and said process further comprises recovering an at least partially desulfurized $H_2$ stream.

9. The process of claim 4 comprising initially heating said catalyst device to at least about 700° C. while passing said reactant gas mixture over said catalyst device until said reaction is initiated.

10. The process of claim 9 comprising maintaining reaction promoting conditions such that said reaction continues autothermally.

11. The process of claim 4 comprising maintaining the temperature of said reactant gas mixture at least about 200° C. prior to entry of said reactant gas stream into the reaction zone of said reactor.

12. The process of claim 4 wherein said $O_2$-containing gas is chosen from the group consisting of purified $O_2$, air, and $O_2$ enriched air.

13. The process of claim 4 wherein said reactor comprises a porous thermal shield disposed between said mixing zone and said reaction zone.

14. The process of claim 1 wherein said catalyst device comprise at least one structure chosen from the group consisting of gauzes, monoliths and a plurality of divided units.

15. The process of claim 14 wherein said divided units comprise particles, granules, beads, pills, pellets, cylinders, trilobes, extrudates or spheres.

16. The process of claim 1 wherein said catalyst device comprises at least one catalytic metal having activity for catalyzing the reaction $H_2S+\frac{1}{2}O_2 \rightarrow 1/x\ S_x+H_2O(x=2, 6\ or\ 8)$.

17. The process of claim 16 wherein said catalyst device comprises at least one catalytic metal chosen from the group consisting of platinum, rhodium, ruthenium, iridium, nickel, palladium, iron, cobalt, rhenium and rubidium.

18. The process of claim 17, wherein said catalyst device comprises at least one catalytic metal chosen from consisting of platinum, rhodium, ruthenium, nickel, palladium and iridium.

19. The process of claim 18 wherein said catalytic metal comprises platinum, rhodium or a mixture thereof.

20. The process of claim 16 wherein said catalytic metal comprises vanadium, bismuth or antimony.

21. The process of claim 16 wherein said catalyst device comprises at least one lanthanide element chosen from the group consisting of La, Ce, Pr, Nd, Pm, Sm Eu, Gd, Th, Dy, Ho, Er, Tm, Yb and Lu.

22. The process of claim 21 wherein said lanthanide element is samarium, ytterbium or praseodymium.

23. The process of claim 14 wherein said structure comprises a refractory support.

24. The process of claim 23 wherein said catalyst device comprises zirconia, alpha-alumina or a metal oxide of a lanthanide.

25. The process of claim 23 wherein said catalyst device comprises platinum and a lanthanide metal oxide chosen from the group consisting of cerium oxide and lanthanum oxide.

26. The process of claim 23 wherein said catalyst device comprises rhodium and samarium oxide.

27. The process of claim 23 wherein said catalyst device comprises a platinum-rhodium alloy disposed on a lanthanide oxide coated refractory support.

28. The process of claim 27 wherein said catalyst device comprises samarium oxide.

29. The process of claim 16 wherein said catalyst device comprises at least one catalytic carbided metal.

30. The process of claim 29 wherein said at least one carbided metal comprises platinum and rhodium.

31. The process of claim 1 wherein said contact time is less than 50 milliseconds.

32. The process of claim 31 wherein said contact time is less than 20 milliseconds.

33. The process of claim 32 wherein said contact time is 10 milliseconds or less.

34. The process of claim 1 comprising operating said process at superatmospheric reactant gas pressure.

35. The process of claim 1 comprising providing in said reactant gas mixture no more than about a stoichiometric amount of $O_2$ to support said reaction.

36. The process of claim 2 wherein said other gaseous component comprises $H_2$.

37. The process of claim 2 wherein said other gaseous component comprises at least one hydrocarbon.

38. The process of claim 37 wherein said catalyst device comprises a catalyst material that is more selective for catalyzing the partial oxidation of $H_2S$ according to said reaction than for catalyzing the combustion or partial oxidation of said hydrocarbon.

39. The process of claim 1 wherein flowing said stream of said reactant gas mixture over said catalyst device comprises a GHSV of at least about 100,000 $h^{-1}$.

40. A process of removing $H_2S$ from an $H_2S$-containing gas stream comprising:
   providing a stream of $H_2S$-containing gas comprising about 0.5 to 100 vol % $H_2S$, and, optionally, another gaseous component;
   forming a reactant gas mixture comprising said $H_2S$-containing gas, $O_2$ and, optionally, said other gaseous component;
   contacting said reactant gas mixture with a catalyst device at a contact time of 200 milliseconds or less, such that a product gas stream is formed comprising elemental sulfur, water, and, optionally, said other gaseous component, wherein said catalyst device is active for catalyzing the partial oxidation of $H_2S$ to form elemental sulfur and water, and, if said other gaseous component is present in said reactant gas mixture, said catalyst device is more selective for catalyzing the partial oxidation of $H_2S$ than for catalyzing the combustion or partial oxidation of said other gaseous component;
   maintaining the temperature of said catalyst device above 500° C. during said contacting;
   condensing elemental sulfur from said product gas stream; and,
   optionally, recovering said other component from said product gas stream.

41. The process of claim 40 wherein said $H_2S$-containing gas comprises about 3–25 vol % $H_2S$.

42. The process of claim 41 wherein said $H_2S$-containing gas comprises up to about 40 vol % $H_2S$.

43. A process of recovering elemental sulfur from an $H_2S$-containing gas stream comprising:
   forming a reactant gas mixture comprising said $H_2S$-containing gas and $O_2$;
   maintaining the temperature of said reactant gas mixture above the dew point of elemental sulfur,
   contacting said reactant gas mixture with a catalyst device at a temperature in the range of about 900° C. to about 1,300° C., to form a product gas stream comprising elemental sulfur and water, said contacting comprising a contact time of up to about 10 milliseconds;
   cooling said product stream to the dewpoint temperature of elemental sulfur, or lower, such that sulfur is condensed from said product stream; and
   recovering said condensed elemental sulfur.

* * * * *

UNITED STATES PATENT AND TRADEMARK OFFICE
CERTIFICATE OF CORRECTION

PATENT NO. : 6,946,111 B2  
APPLICATION NO. : 10/024679  
DATED : September 20, 2005  
INVENTOR(S) : Alfred E. Keller et al.

Page 1 of 1

It is certified that error appears in the above-identified patent and that said Letters Patent is hereby corrected as shown below:

<u>Column 3,</u>
Line 47, after "Li" delete "at" and insert -- et --.

<u>Column 8,</u>
Line 34, delete "at is" and insert -- at --.
Line 55, delete "O2 air," and insert -- O2, air, --.

<u>Column 24,</u>
Line 65, delete "comprise" and insert -- comprises --.

<u>Column 25,</u>
Line 13, insert -- the group -- after "from" and before "consisting".
Line 22, delete "Th" and insert -- Tb --.

Signed and Sealed this

Twenty-seventh Day of June, 2006

JON W. DUDAS  
*Director of the United States Patent and Trademark Office*